US012539326B2

(12) United States Patent
Hansen et al.

(10) Patent No.: US 12,539,326 B2
(45) Date of Patent: Feb. 3, 2026

(54) METHODS FOR TREATING ALZHEIMER'S DISEASE USING SEMAGLUTIDE

(71) Applicant: Novo Nordisk A/S, Bagsvaerd (DK)

(72) Inventors: Charlotte Christine Thim Hansen, Soeborg (DK); Lotte Bjerre Knudsen, Jerslev (DK); Anna Secher, Koebenhavn (DK); Daniél Vega Møller, Basel (CH)

(73) Assignee: Novo Nordisk A/S, Bagsvaerd (DK)

( * ) Notice: Subject to any disclaimer, the term of this patent is extended or adjusted under 35 U.S.C. 154(b) by 0 days.

(21) Appl. No.: 18/979,068

(22) Filed: Dec. 12, 2024

(65) Prior Publication Data

US 2025/0099549 A1 Mar. 27, 2025

Related U.S. Application Data

(63) Continuation of application No. 18/426,412, filed on Jan. 30, 2024, which is a continuation of application No. 18/208,485, filed on Jun. 12, 2023, now abandoned, which is a continuation of application No. 17/736,116, filed on May 4, 2022, now abandoned, which is a continuation of application No. PCT/EP2020/081087, filed on Nov. 5, 2020.

(30) Foreign Application Priority Data

Nov. 6, 2019 (EP) ..................... 19207501
Jul. 20, 2020 (EP) ..................... 20186623

(51) Int. Cl.
*A61K 38/26* (2006.01)
*A61K 9/20* (2006.01)
*A61P 25/28* (2006.01)

(52) U.S. Cl.
CPC ........... *A61K 38/26* (2013.01); *A61K 9/2013* (2013.01); *A61P 25/28* (2018.01)

(58) Field of Classification Search
CPC ........ A61K 38/26; A61K 9/2013; A61P 25/28
See application file for complete search history.

(56) References Cited

U.S. PATENT DOCUMENTS

| | | |
|---|---|---|
| 10,335,462 B2 | 7/2019 | Jensen |
| 10,960,052 B2 | 3/2021 | Sauerberg et al. |
| 11,220,534 B2 | 1/2022 | Holscher |
| 11,318,191 B2 | 5/2022 | Engelund et al. |
| 2014/0221280 A1 | 8/2014 | Bloom |
| 2017/0112897 A1 | 4/2017 | Talbot et al. |
| 2019/0142905 A1 | 5/2019 | Zimmer et al. |
| 2022/0280612 A1 | 9/2022 | Friedrich et al. |

FOREIGN PATENT DOCUMENTS

| | | |
|---|---|---|
| CL | 2019001512 A1 | 11/2019 |
| WO | 03/011892 A2 | 2/2003 |
| WO | 2007005738 A2 | 1/2007 |
| WO | 2008019147 A2 | 2/2008 |
| WO | 2011075393 A2 | 6/2011 |
| WO | WO-2016/198624 A1 | 12/2016 |
| WO | 17112889 A1 | 6/2017 |

OTHER PUBLICATIONS

Zhang et al., "Semaglutide is Neuroprotective and Reduces [alpha]-Synuclein Levels in the Chronic MPTP Mouse Model of Parkinson's Disease", Journal of Parkinson's Disease, vol. 9, No. 1, Feb. 2019, pp. 157-171.
Day et al., "Therapeutic Potential of Glucagon-Like Peptide-1 Cleavage Product for Alzheimer's Disease", Insight, Neurosci. Bull., Mar. 2019, vol. 35, pp. 934-936.
Femminella et al., "Evaluating the effects of the novel GLP-1 analogue liraglutide in Alzheimer's disease: study protocol for a randomised controlled trial (ELAD study)", Trials, Apr. 3, 2019, vol. 20, Article No. 191, p. 1-10.
Talbot, "Brain insulin resistance in Alzheimer's disease and its potential treatment with GLP-1 analogs", Neurodegener Dis Manag., 2014, vol. 4, No. 1, p. 31-40.
Knudsen et al., "The discovery and development of liraglutide and semaglutide," Frontiers in Endocrinology, Apr. 2019, vol. 10, Article 155, pp. 1-32.
Buckley, Stephen T. et al., "Transcellular stomach absorption of a derivatized glucagon-like peptide-1 receptor agonist" Science Translational Medicine, Nov. 14, 2018, vol. 10, No. 14, eaar7047 pp. 1-13.
American Diabetes Association, "12. Older Adults: Standards of Medical Care in Diabetes—2019." Diabetes care, Jan. 2019, vol. 42, No. 1, pp. S139-S147.
American Diabetes Association., "9. Pharmacologic Approaches to Glycemic Treatment: Standards of Medical Care in Diabetes—2019.", Diabetes Care, Jan. 2019, vol. 42, No. 1, pp. 90-102.
Batista et al. "The diabetes drug liraglutide reverses cognitive impairment in mice and attenuates insulin receptor and synaptic pathology in a non-human primate model of Alzheimer's disease •Liraglutide protects memory, insulin receptors, and synapses." The Journal of Pathology, Apr. 2018, vol. 245, No. 1, pp. 85-100.
Biessels et al., "Effect of Linagliptin on Cognitive Performance in Patients With Type 2 Diabetes and Cardiorenal Comorbidities: The Carmelina Randomized Trial." Diabetes Care, Oct. 2019, Epub ahead, vol. 42, No. 10, pp. 1-9.
Boccardi, et al Diabetes drugs in the fight against Alzheimer's disease Ageing Research Reviews, Jul. 2019, vol. 54, No. 100936, pp. 1-8.

(Continued)

*Primary Examiner* — Gyan Chandra
(74) *Attorney, Agent, or Firm* — Foley & Lardner LLP

(57) ABSTRACT

The present invention relates to improved medical therapies for all forms and stages of dementia involving administration of (i) GLP-1 receptor agonists to subjects with metabolic syndrome or (ii) semaglutide.

29 Claims, 10 Drawing Sheets

Specification includes a Sequence Listing.

(56) References Cited

OTHER PUBLICATIONS

Borgan et al., "Methods for the analysis of sampled cohort data in the Cox proportional hazards model.", The Annals of Statistics, Oct. 1995, vol. 23, No. 5, pp. 1749-1778.
Brundin et al., "Fire prevention in the parkinson's disease brain." Nat Med, Jul. 2018, vol. 24, No. 7, pp. 899-907.
ClinicalTrials.gov. Bethesda (MD): "Biomarker Qualification for Risk of Mild Cognitive Impairment (MCI) Due to Alzheimer's Disease (AD) and Safety and Efficacy Evaluation of Pioglita." National Library of Medicine (US), Feb. 29, 2000, Identifier NCT01931566, retrieved Apr. 23, 2020 https://clinicaltrials.gov/ct2/show/NCT01931566.
Corbett et al., "Drug repositioning for Alzheimer's disease." Nat Rev Drug Discov, Nov. 2012, vol. 11, No. 11, pp. 833-846.
During et al. "Glucagon-like peptide-1 receptor is involved in learning and neuroprotection." Nature medicine, Sep. 2003, vol. 9, No. 9, pp. 1173-1179.
Egan et al. "Randomized Trial of Verubecestat for Prodromal Alzheimer's Disease.", NEJM, Apr. 2019, vol. 380, No. 15, pp. 1408-1420.
Gejl et al. In Alzheimer's Disease, 6-Month Treatment with GLP-1 Analog Prevents Decline of Brain Glucose Metabolism: Randomized, Placebo-Controlled, Double-Blind Clinical Trial. Front Aging Neurosci, May 2016, vol. 8, No. 108, pp. 1-10.
Gomperts et al., "Lewy Body Dementias : Dementia With Lewy Bodies and Parkinson Disease Dementia", Continuum—Lifelong Learning in Neurology: The Official CME Journal of the American Academy of Neurology, Apr. 2016, vol. 22, No. 2, pp. 435-463.
Gudala et al. "Diabetes mellitus and risk of dementia: A meta? analysis of prospective observational studies." Journal of diabetes investigation, Apr. 2013, vol. No 6, pp. 640-650.
Hansen et al. "Long-term treatment with liraglutide, a glucogon-like peptide-1 (GLP-1) receptor agonist, has no effect on ?-amyloid plaque load in two transgenic APP/PS1 mouse models of Alzheimer's disease." PLoS One, Jul. 2016, vol. 11, No. 7, pp. 1-23.
Hansen et al., "The GLP-1 receptor agonist liraglutide reduces pathology-specific tau phosphorylation and improves motor function in a transgenic hTauP301L mouse model of tauopathy." Brain Res, Mar. 2016, vol. 1634, p. 158-70.
Hansen et al., "The GLP-1 Receptor Agonist Liraglutide Improves Memory Function and Increases Hippocampal CA1 Neuronal Numbers in a Senescence-Accelerated Mouse Model of Alzheimer's Disease." J Alzheimer's Dis, Mar. 2015, vol. 46, pp. 877-888.
Henley et al., "Preliminary Results of a Trial of Atabecestat in Preclinical Alzheimer's Disease." NEJM, Apr. 2019, vol. 380, No. 15, pp. 1483-1485.
Heppner et al., "Expression and Distribution of Glucagon-Like Peptide-1 Receptor mRNA, Protein and Binding in the Male Nonhuman Primate (*Macaca mulatta*) Brain." Endocrinology, Jan. 2015, vol. 156, No. 1, pp. 255-267.
Husain et al., "Oral Semaglutide and Cardiovascular Outcomes in Patients with Type 2 Diabetes". NEJM, Aug. 2019, vol. 381, No. 9, pp. 841-851.
International Diabetes Federation. IDF Diabetes Atlas, 2017, pp. 1-150.
Jensen et al., "Characterization of the Glucagonlike Peptide-1 Receptor in Male Mouse Brain Using a Novel Antibody and In Situ Hybridization.", Endocrinology, Feb. 2018, vol. 159, No. 2, pp. 665-675.
Kildemoes et al. "The Danish National Prescription Registry." Scand J Public Health, Jul. 2011, vol. 39, No. 7, pp. 38-41.
Koekkoek et al., "Cognitive function in patients with diabetes mellitus: guidance for daily care.". Lancet Neurol, Mar. 2015, vol. 14, No. 3, pp. 329-340.
Lao, Kejing, et al. "Drug development for Alzheimer's disease." Journal of drug targeting, Feb. 2019, vol. 27, No. 2, pp. 164-173.
Marso et al. Liraglutide and Cardiovascular Outcomes in Type 2 Diabetes. N Engl J Med, Jul. 2016, vol. 375, No. 4, pp. 311-322.
Marso, S. P. et al., "Semaglutide and cardiovascular outcomes in patients with Type 2 Diabetes", The New England Journal of Medicine, 2016, vol. 375, pp. 1834-1844.
Masahiro et al. "GLP-1 analogs represent a novel treatment strategy for Alzheimer's disease in patients with type 2 diabetes." Diabetes, 2013, vol. 62, pp. A308-A308.
Masahiro, et al. "GLP-1 Analogs Prevent Alzheimer's Disease in Patients with Type 2 Diabetes." Diabetes, 2014, vol. 63, pp. A580-A580.
Mathys et al., Single-cell transcriptomic analysis of Alzheimer's disease. Nature, May 2019, vol. 570, No. 7761, pp. 332-337.
Matveeva, et al. Antidiabetic drugs and cognitive impairment in type 2 diabetes. Medical science, May Jun. 2019, vol. 23, No. 97, pp. 1-6.
McClean et al., "Liraglutide can reverse memory impairment, synaptic loss and reduce plaque load in aged APP/PS1 mice, a model of Alzheimer's disease." Neuropharmacology, Jan. 2014, vol. 76, Part A, pp. 57-67.
McClean et al., Prophylactic liraglutide treatment prevents amyloid plaque deposition, chronic inflammation and memory impairment in APP/PS1 mice, Behav Brain Res, Oct. Jul. 2015, vol. 293, pp. 96-106.
McMillan et al., "Impact of pharmacological treatment of diabetes mellitus on dementia risk systematic review and meta-analysis", BMJ Open Diabetes Research and Care, Nov. 2018, vol. 6, No. e000563 pp. 1-12.
Nordengen et al. "Glial activation and inflammation along the Alzheimer's disease continuum." J Neuroinflammation, Feb. 2019, vol. 16, No. 46, pp. 1-13.
Pedersen, "The Danish civil registration system." Scand J Public Health, Jul. 2011; Voiume 39, No. 7, pp. 22-25.
Phung et al. "Validity of Dementia Diagnoses in the Danish Hospital Registers." Dement Geriatr Cogn Disord, Aug. 2007, vol. 24, pp. 220-228.
Pottegård, Anton, et al. "Use of exenatide and liraglutide in Denmark: a drug utilization study." European journal of clinical pharmacology, Feb. 2014, vol. 70, No. 2,, pp. 205-214.
Prince et al. "World Alzheimer report 2016: improving healthcare for people living with dementia: coverage, quality and costs now and in the future." Alzheimer's Dis Int, Sep. 2016, pp. 1-127.
Rakipovski et al. "The GLP-1 Analogs Liraglutide and Semaglutide Reduce Atherosclerosis in ApoE-/- and LDLr-/- Mice by a Mechanism That Includes Inflammatory Pathways." JACC Basic Transl Sci, Dec. 2018, vol. 3, No. 6, pp. 844-856.
Rawlings et al. "Diabetes in midlife and cognitive change over 20 years: a cohort study." Annals of internal medicine, Dec. 2014, vol. 161, No. 11pp. 785-793.
Schmidt et al. "The Danish National patient registry: A review of content, data quality, and research potential." Clin Epidemiol, Nov. 2015, vol. 7, pp. 449-490.
Watson et al. "Neural correlates of liraglutide effects in persons at risk for Alzheimer's disease" Behavioural Brain Research, Aug. 2018, vol. 356, pp. 271-278.
Wium-Andersen et al., "Antidiabetic medication and risk of dementia in patients with type 2 diabetes. A nested case-control study." Eur J Endocrinol, Nov. 2019, vol. 181, No. 5, pp. 499-507.
World Health Organization. Dementia [Fact Sheet] [Internet]. Sep. 2019; Available from: https://www.who.int/news-room/fact-sheets/detail/dementia, Retrieved on Apr. 22, 2020.
Wu, et al. "Low glucagon-like peptide-1 (GLP-1) concentration in serum is indicative of mild cognitive impairment in type 2 diabetes patients" Clinical Neurology and Neurosurgery, Nov. 2018, vol. 174, pp. 203-206.
Xu et al. "Exendin-4, a glucagon-like peptide-1 receptor agonist, reduces Alzheimer disease-associated tau hyperphosphorylation in the hippocampus of rats with type 2 diabetes." Journal of investigative medicine, Dec. 2015, vol. 63, No. 2, pp. 267-272.
Yang et al. "Subcutaneous administration of liraglutide ameliorates Alzheimer-associated tau hyperphosphorylation in rats with type 2 diabetes." Journal of Alzheimer's Disease, Jan. 2013, vol. 37, No. 3, pp. 637-648.

(56) References Cited

OTHER PUBLICATIONS

Yun et al. "Block of A1 astrocyte conversion by microglia is neuroprotective in models of Parkinson's disease." Nat Med, Jul. 2018, vol. 24, pp. 931-938.
Zhang et al: "Neuroprotective effects of the novel GLP-1 long acting analogue semaglutide in the MPTP Parkinson's disease mouse model", Neuropeptides, Churchill Livingstone, GB, Jul. 2018, vol. 71, No, pp. 70-80.
Batista, et al., "Neuroprotective Actions of Glucagon-Like Peptide-1 (GLP-1) Analogues in Alzheimer's and Parkinson's Diseases," CNS Drugs, vol. 33; Dec. 3, 2018; pp. 209-223.
Butterfield, et al., "Oxidative stress, dysfunctional glucose metabolism and Alzheimer disease," Nature Reviews Neuroscience, vol. 20; Mar. 2019; pp. 148-160.
Calsolaro, et al., "Novel GLP-1 (Glucagon-Like Peptide-1) Analogues and Insulin in the Treatment for Alzheimer's Disease and Other Neurodegenerative Diseases," CNS Drugs, vol. 29; Dec. 14, 2015; pp. 1023-1039.
Chang, et al., "Semaglutide-mediated protection against A[beta] correlated with enhancement of autophagy and inhibition of apotosis," J. Clinical Neuroscience. vol. 81; Oct. 2020; pp. 234-239.
Cheignon, et al., "Oxidative stress and the amyloid beta peptide in Alzheimer's disease," Redox Biology, vol. 14; Oct. 18, 2017; pp. 450-464.
Cummings, Jeffrey L. et al.; "evoke and evoke : design of two large-scale, double-blind, placebo-controlled, phase 3 studies evaluating efficacy, safety, and tolerability of semaglutide in early-stage symptomatic Alzheimer's disease"; Alzheimer's Research & Therapy, vol. 17, No. 14; Jan. 8, 2025; 12 pages.
European Medicines Agency; Assessment Report: Ozempic; Procedure No. EMEA/H/C/004174/0000; Dec. 14, 2017; 156 pages.
European Patent Office Communication of Notice of Opposition: European Patent No. 4054620, European Application No. 20803489. 2; Feb. 13, 2025; 27 pages.
European Patent Office Communication of Notice of Opposition: European Patent No. 4054620, European Application No. 20803489. 2; Mar. 5, 2025; 28 pages.
Grieco, Maddalena et al.; "Glucagon-Like Peptide-1: A Focus on Neurodegenerative Diseases"; Frontiers in Neuroscience, vol. 13, No. 1112; Oct. 18, 2019; 7 pages.
McClean, Paula L. et al.; "The Diabetes Drug Liraglutide Prevents Degenerative Process in a Mouse Model of Alzheimer's Disease"; The Journal of Neuroscience, vol. 31, No. 17; Apr. 27, 2011; pp. 6587-6594.
Novo Nordisk; Company Announcement No. 12/2018; "Ozempic (semaglutide) approved in the EU for the treatment of type 2 diabetes"; Feb. 9, 2018; 2 pages.
Rybelsus; Highlights of Prescribing Information; Sep. 2019; 25 pages.
Schulen, Helmut, "Pre-specified vs. post-hoc subgroup analyses: are we wiser before or after a trial has been performed?" European Heart Journal, vol. 35; Jun. 20, 2014; pp. 2055-2057.
Simsir, et al., "Glucagon like peptide-1 (GLP-1) likes Alzheimer's disease," Diabetes & Metabolic Syndrome: Clinical Research & Reviews, vol. 12; May 2018; pp. 469-475.
Wang, et al., "Associations of semaglutide with first-time diagnosis of Alzheimer's disease in patients with type 2 diabetes: Target trial emulation using nationwide real-world data in the US," Alzheimer's and Dementia, vol. 20, No. 12; Oct. 2024; pp. 8661-8672.
Novo Nordisk A/S; "Evoke phase 3 trials did not demonstrate a statistically significant reduction in Alzheimer's disease progression"; Company Announcement No. 37/2025; Nov. 24, 2025; https://www.novonordisk.com/content/nncorp/global/en/news-and-media/news-and-ir-materials/news-details.html?id=916462#.

METHODS FOR TREATING ALZHEIMER'S DISEASE USING SEMAGLUTIDE

CROSS-REFERENCE TO RELATED APPLICATIONS

This application is a continuation of U.S. application Ser. No. 18/426,412, filed Jan. 30, 2024, which is a continuation of U.S. application Ser. No. 18/208,485, filed Jun. 12, 2023, which is a continuation of U.S. application Ser. No. 17/736,116, filed May 4, 2022, which is a continuation of International Application PCT/EP2020/081087 (WO 2021/089678), filed Nov. 5, 2020, which claims priority to European Patent Application 19207501.8, filed Nov. 6, 2019 and European Patent Application 20186623.3 filed Jul. 20, 2020, the contents of which are incorporated herein by reference.

The present invention relates to GLP-1 receptor agonists for use in the treatment of all forms and stages of dementia.

INCORPORATION-BY-REFERENCE OF THE SEQUENCE LISTING

The instant application contains a Sequence Listing which has been submitted in XML format via the USPTO patent electronic filing system and is hereby incorporated by reference in its entirety. Said XML file, created on Jan. 10, 2024, is named 190095US04.xml and is 2 kilobytes in size.

BACKGROUND

No treatment options are currently available to actively prevent or slow progression to dementia and no new pharmacological therapies have been approved for the treatment of dementia within the last 20 years. According to WHO, approximately 50 million people worldwide have dementia, this number is projected to triple by 2050, and Alzheimer's disease is the most common form of dementia and may contribute to 60-70% of cases. Intensive efforts have so far failed to identify any medical treatments that prevent, delay, or modify the disease course of dementia, including recent unsuccessful trials focusing on reducing production or enhancing clearance of amyloid-β. Thus, improved pharmacological therapies for patients with dementia are desired. It is an important unanswered question to determine whether GLP-1 receptor agonists have an effect on dementia in humans.

SUMMARY

The present invention relates to improved medical therapies for dementia involving administration of GLP-1 receptor agonists.

In some embodiments the invention relates to methods for the treatment of dementia, wherein said method comprises administering a GLP-1 receptor agonist to a subject in need thereof, said subject has metabolic syndrome, and said GLP-1 receptor agonist comprises GLP-1(7-37) (SEQ ID No: 1) optionally comprising one or more substitutions, deletions, additions and/or modifications.

In some embodiments the invention relates to methods for the treatment of dementia, wherein said method comprises administering semaglutide to a subject in need thereof.

DESCRIPTION

Figure 1:
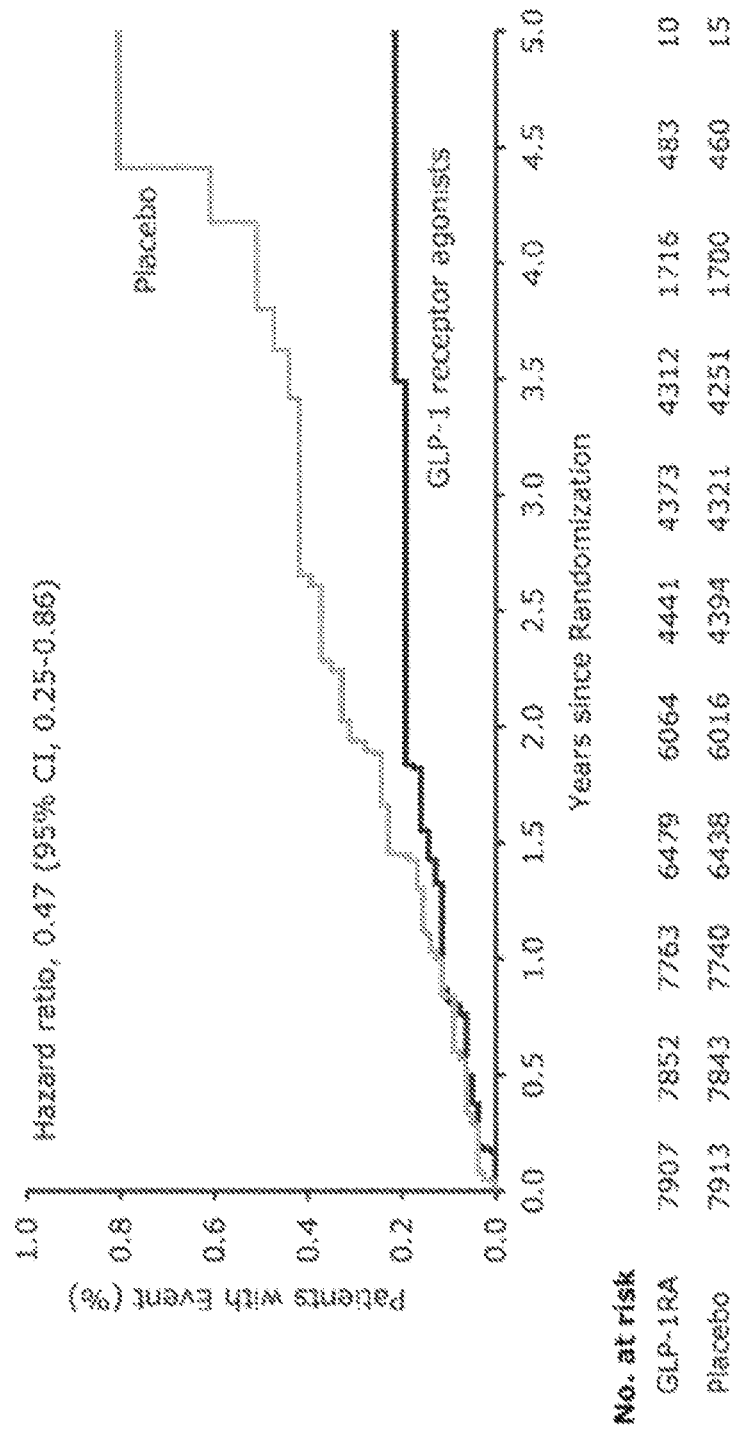
FIG. 1 shows time to dementia with GLP-1 receptor agonists versus placebo in pooled RCTs; in the pooled RCTs, 15 patients randomized to a GLP-1 receptor agonist (0.66 per 1000 patient-years) and 32 patients randomized to placebo (1.41 per 1000 patient-years) developed dementia. GLP-1RA=GLP-1 receptor agonists.

The present inventors surprisingly found that administration of glucagon-like peptide 1 (GLP-1) receptor agonists reduced the risk of dementia in subjects with metabolic syndrome. Furthermore, the inventors surprisingly found that semaglutide improved dementia in animal models.

In some embodiments the invention relates to a method for the treatment of dementia, wherein said method comprises administering a GLP-1 receptor agonist to a subject in need thereof and said subject has metabolic syndrome. In some embodiments the invention relates to a method for the treatment of dementia, wherein said method comprises administering a GLP-1 receptor agonist to a human subject in need thereof and said subject has one or more indications selected from the group consisting of pre-diabetes, diabetes, cardiovascular disease, obesity, and hypertension. In some embodiments the invention relates to a method for the treatment of dementia, wherein said method comprises administering semaglutide to a subject in need thereof.

In some embodiments the invention relates to a method for reducing the risk of developing dementia, wherein said method comprises administering a GLP-1 receptor agonist to a subject in need thereof and said subject has metabolic syndrome. In some embodiments the invention relates to a method for reducing the risk of developing dementia, wherein said method comprises administering a GLP-1 receptor agonist to a subject in need thereof and said subject has one or more indications selected from the group consisting of pre-diabetes, diabetes, cardiovascular disease, obesity, and hypertension. In some embodiments the invention relates to a method for reducing the risk of developing dementia, wherein said method comprises administering semaglutide to a subject in need thereof.

Dementia exists in different degrees of severity. In some embodiments, the term "dementia" as used herein refers to all forms of and stages of the dementia disease continuum.

In some embodiments dementia is selected from the group of indications defined in ICD-11: Dementia due to Alzheimer disease; Dementia due to Alzheimer disease with early onset; Autosomal dominant Alzheimer disease dementia, mutation of presenilin 1; Autosomal dominant Alzheimer disease dementia, mutation of presenilin 2; Autosomal dominant Alzheimer disease dementia, mutation of amyloid precursor protein; Dementia due to Alzheimer disease with late onset; Alzheimer disease dementia, mixed type, with cerebrovascular disease; Alzheimer disease dementia, mixed type, with other nonvascular aetiologies; Non-amnestic Alzheimer disease dementia subtypes; Non-amnestic Alzheimer disease dementia, logopenic variant; Non-amnestic Alzheimer's disease, logopenic variant with primary progressive aphasia; Non-amnestic Alzheimer disease dementia, visuospatial variant; Non-amnestic Alzheimer's disease, visuospatial variant with posterior cortical atrophy; Non-amnestic Alzheimer disease dementia, frontal variant; Alzheimer disease dementia with psychosis; Alzheimer disease dementia with depression; Dementia due to cerebrovascular disease; Vascular dementia haemorrhagic subtype; Vascular dementia ischaemic subtype; Multi-infarct dementia; Single strategic infarct dementia; Dementia due to subcortical vascular encephalopathy; Dementia due to hypoxic encephalopathy; Dementia due to genetic causes; Dementia due to central nervous system vasculitides; Dementia due to hypertensive encephalopathy; Dementia due to intracerebral hypertensive haemorrhage; Dementia due to cerebral amyloid angiopathy; Dementia due to Lewy body disease; Frontotemporal dementia; Frontotemporal dementia, behavioural variant; Frontotemporal dementia, language variant; Frontotemporal dementia, non-fluent or agrammatic variant; Frontotemporal dementia, semantic variant; Frontotemporal dementia, logopenic variant; Frontotemporal dementia with motor neuron disease; Frontotemporal dementia with familial inclusion body myopathy with Paget's disease of bone; Frontotemporal dementia due to genetic mutation; Frontotemporal dementia due to C9orf72 mutation; Frontotemporal dementia due to MAPT mutation; Frontotemporal dementia due to VCP mutation; Frontotemporal dementia due to GRN mutation; Frontotemporal dementia due to CHMP2B mutation; Frontotemporal dementia due to FUS mutation; Frontotemporal dementia due to TARDBP mutation; Frontotemporal dementia due to other or new mutations; Dementia due to psychoactive substances including medications; Dementia due to use of alcohol; Dementia due to use of sedatives, hypnotics or anxiolytics; Posthallucinogen perception disorder; Dementia due to use of volatile inhalants; Post radiation dementia; Dementia due to carbon monoxide poisoning; Dementia due to drug intoxication; Dementia or parkinsonism due to manganese toxicity; Dementia due to diseases classified elsewhere; Dementia due to certain specified central nervous system degenerative diseases; Dementia due to Parkinson disease; Dementia due to Huntington disease; Dementia due to corticobasal degeneration; Dementia due to progressive supranuclear palsy; Dementia due to neurofilament inclusion body disease; Dementia due to progressive subcortical gliosis; Dementia due to multiple system atrophy; Dementia due to spinocerebellar ataxia; Dementia due to neurodegeneration with brain iron accumulation; Dementia due to leukodystrophy; Dementia due to Parkinsonism-dementia complex of Guam; Dementia due to certain specified infectious diseases; Dementia due to human immunodeficiency virus; Dementia due to neurosyphilis; Dementia due to herpes encephalitis; Dementia due to trypanosomiasis; Dementia due to neurocysticercosis; Dementia due to Lyme disease; Dementia due to Whipple disease; Dementia due to progressive multifocal leukoencephalopathy; Certain specified primary degenerative dementias; Neurofibrillary tangle dementia; Familial multiple system tauopathy; Argyrophilic grain disease; Dementia due to certain specified disorders of the central nervous system; Dementia due to multiple sclerosis; Dementia due to prion disease; Dementia due to sporadic Creutzfeldt-Jakob disease; Dementia due to variant Creutzfeldt-Jakob disease; Dementia due to familial Creutzfeldt-Jakob disease; Dementia due to iatrogenic Creutzfeldt-Jakob disease; Dementia due to sporadic fatal insomnia; Dementia due to fatal familial insomnia; Dementia due to Gerstmann-Staussler-Sheinker syndrome; Dementia due to Kuru; Dementia due to acute demyelinating encephalomyelitis; Dementia due to subacute sclerosing panencephalitis; Dementia due to Hashimoto's encephalopathy; Dementia due to paraneoplastic encephalitis; Dementia due to autoimmune encephalitis; Dementia due to primary central nervous system neoplasm; Dementia due to metastatic brain tumour; Dementia due to epilepsy; Dementia due to normal pressure hydrocephalus; Dementia due to metabolic disorders involving the brain; Dementia due to injury to the head; Dementia due to chronic subdural haematoma; Dementia due to obstructive hydrocephalus; Dementia due to exposure to heavy metals and other toxins; Dementia due to nutritional deficiency; Dementia due to thiamine deficiency; Dementia due to vitamin B12 deficiency; Dementia due to folate deficiency; Dementia due to vitamin E deficiency; Dementia due to iron deficiency; Dementia due to other nutritional deficiency; Dementia due to pellagra; Dementia due to metabolic abnormalities; Dementia due to hypercalcaemia; Dementia due to acquired hypothyroidism; Dementia due to Wilson disease; Dementia due to dialysis; Dementia due to hepatic failure; Dementia due to renal failure; Dementia due to chromosomal anomalies; Dementia due to Down syndrome; Dementia due to Fragile X Syndrome; Dementia due to rheumatological diseases; Dementia due to polyarteritis nodosa; Dementia due to systemic lupus erythematosus; Dementia due to Behcet disease; Dementia due to certain specified cause; Behavioural or psychological disturbances in dementia; Psychotic symptoms in dementia; Mood symptoms in dementia; Anxiety symptoms in dementia; Apathy in dementia; Agitation or aggression in dementia; Disinhibition in dementia; Wandering in dementia; End stage dementia; Degenerative dementia; Presenile psychotic mental disorder; Paranoid dementia; Presenile dementia not otherwise specified; Senile dementia; and Old age dementia. In some embodiments dementia is selected from the group consisting of mild cognitive impairment, Alzheimer's disease, mixed dementia, vascular dementia, dementia with Lewy bodies, frontotemporal dementia, pre-senile dementia, and senile dementia. In some embodiments dementia is the Alzheimer's continuum with mild cognitive impairment or mild dementia. In some embodiments dementia is mild cognitive impairment, such as mild cognitive impairment of the Alzheimer's type. In some embodiments dementia is Alzheimer's disease, such as preclinical Alzheimer's disease, mild cognitive impairment of the Alzheimer's type, early onset familial Alzheimer's disease, or prodromal Alzheimer's disease. In some embodiments dementia is mild cognitive impairment of the Alzheimer's type. In some embodiments dementia is mixed dementia. In some embodiments dementia is vascular dementia. In some embodiments dementia is dementia with Lewy bodies. In some embodiments dementia is frontotemporal dementia. In some embodiments dementia is pre-senile dementia. In some embodiments dementia is senile dementia.

In some embodiments, the term "treatment" as used herein encompasses preventing, delaying, reducing the risk of developing, ameliorating, or curatively treating the medical indication referred to. Treatment may be symptomatic treatment or disease modifying treatment. In some embodiments, the term treatment as used herein refers to preventing the medical indication referred to. In some embodiments, the term treatment as used herein refers to delaying (e.g. delaying the onset of) the medical indication referred to. In some embodiments, the term treatment as used herein refers to reducing the risk of developing the medical indication referred to. In some embodiments, the term treatment as used herein refers to ameliorating the medical indication referred to. In some embodiments, the term treatment as used herein refers to curatively treating the medical indication referred to.

Subpopulation

The subject to be administered GLP-1 receptor agonists according to the present invention may be human, such as an adult human (also referred to as adults). In some embodiments the subject has metabolic syndrome. As used herein, the term "metabolic syndrome" refers to one or more indications selected from the group consisting of pre-diabetes, diabetes, cardiovascular disease, obesity, and hypertension. In some embodiments "metabolic syndrome" refers to at least two indications selected from the group consisting of pre-diabetes, diabetes, cardiovascular disease, obesity, and hypertension. In some embodiments "metabolic syndrome" refers to at least three indications selected from the group consisting of pre-diabetes, diabetes, cardiovascular disease, obesity, and hypertension. In some embodiments the subject has pre-diabetes. In some embodiments the subject has diabetes. In some embodiments diabetes is type 2 diabetes. In some embodiments the subject has obesity. In some embodiments the subject has cardiovascular disease. In some embodiments the subject has obesity. In some embodiments obesity is a BMI of at least 25 kg/m$^2$, such as at least 27 kg/m$^2$ or at least 30 kg/m$^2$. In some embodiments the subject has hypertension. In some embodiments cardiovascular disease includes one or more of coronary artery disease (such as angina and myocardial infarction), stroke, heart failure, hypertensive heart disease, rheumatic heart disease, cardiomyopathy, abnormal heart rhythms, congenital heart disease, valvular heart disease, carditis, aortic aneurysms, peripheral artery disease, thromboembolic disease, and venous thrombosis. In some embodiments the subject has previously been administered insulin.

GLP-1 Receptor Agonists

The term "GLP-1 receptor agonist" as used herein refers to a compound, which fully or partially activates the human GLP-1 receptor. In some embodiments, the GLP-1 receptor agonist for use in the present invention is an acylated GLP-1 receptor agonist. The term "acylated" as used in relation to GLP-1 receptor agonists refers to the GLP-1 receptor agonist having covalently attached at least one substituent comprising a lipophilic moiety, such as a fatty acid or a fatty diacid. In some embodiments the substituent comprises a fatty acid or a fatty diacid. In some embodiments, the term GLP-1 receptor agonist as well as the specific GLP-1 receptor agonists described herein also encompass salt forms thereof.

It follows that the GLP-1 receptor agonist should display "GLP-1 activity" which refers to the ability of the compound, i.e. GLP-1 receptor agonist, to bind to the GLP-1 receptor and initiate a signal transduction pathway resulting in insulinotropic action or other physiological effects as is known in the art. In some embodiments the "GLP-1 receptor agonist" binds to a GLP-1 receptor, e.g., with an affinity constant ($K_D$) or activate the receptor with a potency ($EC_{50}$) of below 1 µM, e.g. below 100 nM as measured by methods known in the art (see e.g. WO 98/08871) and exhibits insulinotropic activity, where insulinotropic activity may be measured in vivo or in vitro assays known to those of ordinary skill in the art. For example, the GLP-1 receptor agonist may be administered to an animal with increased blood glucose (e.g. obtained using an Intravenous Glucose Tolerance Test (IVGTT). A person skilled in the art will be able to determine a suitable glucose dosage and a suitable blood sampling regime, e.g. depending on the species of the animal, for the IVGTT) and measure the plasma insulin concentration over time. Suitable assays have been described in such as WO2015/155151.

The term half maximal effective concentration ($EC_{50}$) generally refers to the concentration which induces a response halfway between the baseline and maximum, by reference to the dose response curve. $EC_{50}$ is used as a measure of the potency of a compound and represents the concentration where 50% of its maximal effect is observed. Due to the albumin binding effects of GLP-1 receptor agonists comprising a substituent as described herein, it is important to pay attention to if the assay includes human serum albumin or not.

The in vitro potency of the GLP-1 receptor agonist may be determined as described in WO2015/155151, Example 29 without Human Serum Albumin (HSA), and the $EC_{50}$ determined. The lower the $EC_{50}$ value, the better the potency. In some embodiments the potency (EC50) as determined (without HSA) is 5-1000 pM, such as 10-750 pM, 10-500 pM or 10-200 pM. In some embodiments the EC50 (without HSA) is at most 500 pM, such as at most 300 pM, such as at most 200 pM. In some embodiments the EC50 (without HSA) is comparable to human GLP-1 (7-37). In some embodiments the EC50 (without HSA) is at most 50 pM. In a further such embodiment the EC50 is at most 40 pM, such as at most 30 pM such as at most 20 pM, such as at most 10 pM. In some embodiments the EC50 is about 10 pM.

Also, or alternatively, the binding of the GLP-1 receptor agonist to albumin may be measured using the in vitro potency assay of Example 29 in WO2015/155151 including HSA. An increase of the in vitro potency, $EC_{50}$ value, in the presence of serum albumin reflects the affinity to serum albumin. In some embodiments the potency (EC50) as determined (with 1% HSA) is 5-1000 pM, such as 100-750 pM, 200-500 pM or 100-400 pM. In some embodiments the EC50 (with 1% HSA) is at most 750 pM, such as at most 500 pM, such as at most 400 pM, such as at most 300 or such as at most 250 pM.

If desired, the fold variation in relation to a known GLP-1 receptor agonist may be calculated as EC50(test compound)/EC50(known compound), and if this ration is such as 0.5-1.5, or 0.8-1.2 the potencies are considered to be equivalent. In some embodiments the potency, EC50 (without HSA), is equivalent to the potency of liraglutide. In some embodiments the potency, EC50 (without HSA), is equivalent to the potency of semaglutide. In some embodiments the potency, EC50 (with 1% HSA), is equivalent to the potency of liraglutide. In some embodiments the potency, EC50 (with 1% HSA), is equivalent to the potency of semaglutide.

In some embodiments the GLP-1 receptor agonist comprises one or more substitutions, deletions, additions and/or modifications. In some embodiments a modification is a covalently attached substituent. In some embodiments the GLP-1 receptor agonist comprises a peptide which is the human GLP-1 (GLP-1(7-37)) or a variant thereof. Human GLP-1, also referred to herein as "GLP-1(7-37)", has the sequence HAEGTFTSDV SSYLEGQAAKEFI- AWLVKGRG (SEQ ID No: 1). In some embodiments the term "variant" refers to a compound which comprises one or more amino acid substitutions, deletions, additions and/or modifications. Such addition or deletion of amino acid residues may take place at the N-terminal of the peptide and/or at the C-terminal of the peptide. In some embodiments a simple nomenclature is used to describe the GLP-1 receptor agonist, e.g., [Aib8] GLP-1(7-37) designates a GLP-1(7-37) receptor agonist wherein the naturally occurring Ala in position 8 has been substituted with Aib. In some embodiments the GLP-1 receptor agonist comprises a maximum of 12 amino acids which have been altered, e.g., by substitution, deletion, insertion and/or modification, compared to GLP-1(7-37) (SEQ ID No: 1). In some embodiments the GLP-1 receptor agonist comprises a maximum of 10 amino acids which have been altered, e.g., by substitution, deletion, insertion and/or modification, compared to GLP-1(7-37) (SEQ ID No: 1). In some embodiments the GLP-1 receptor agonist comprises a maximum of 9 amino acids which have been altered, e.g., by substitution, deletion, insertion and/or modification, compared to GLP-1(7-37) (SEQ ID No: 1). In some embodiments the GLP-1 receptor agonist comprises a maximum of 8 amino acids which have been altered, e.g., by substitution, deletion, insertion and/or modification, compared to GLP-1(7-37) (SEQ ID No: 1). In some embodiments the GLP-1 receptor agonist comprises a maximum of 7 amino acids which have been altered, e.g., by substitution, deletion, insertion and/or modification, compared to GLP-1(7-37) (SEQ ID No: 1). In some embodiments the GLP-1 receptor agonist comprises a maximum of 6 amino acids which have been altered, e.g., by substitution, deletion, insertion and/or modification, compared to GLP-1(7-37) (SEQ ID No: 1). In some embodiments the GLP-1 receptor agonist comprises a maximum of 5 amino acids which have been altered, e.g., by substitution, deletion, insertion and/or modification, compared to GLP-1(7-37) (SEQ ID No: 1). In some embodiments the GLP-1 receptor agonist comprises a maximum of 4 amino acids which have been altered, e.g., by substitution, deletion, insertion and/or modification, compared to GLP-1(7-37) (SEQ ID No: 1). In some embodiments the GLP-1 receptor agonist comprises a maximum of 3 amino acids which have been altered, e.g., by substitution, deletion, insertion and/or modification, compared to GLP-1(7-37) (SEQ ID No: 1). In some embodiments the GLP-1 receptor agonist comprises a maximum of 2 amino acids which have been altered, e.g., by substitution, deletion, insertion and/or modification, compared to GLP-1(7-37) (SEQ ID No: 1). Unless otherwise stated the GLP-1 comprises only L-amino acids.

In some embodiments the GLP-1 receptor agonist exhibits at least 60%, 65%, 70%, 80% or 90% sequence identity to GLP-1(7-37) over the entire length of GLP-1(7-37). As an example of a method for determination of sequence identity between two compounds, the two peptides [Aib8]GLP-1(7-37) and GLP-1(7-37) are aligned. The sequence identity of

[Aib8]GLP-1(7-37) relative to GLP-1(7-37) is given by the number of aligned identical residues minus the number of different residues divided by the total number of residues in GLP-1(7-37). Accordingly, in said example the sequence identity is (31-1)/31.

In some embodiments the C-terminal of the GLP-1 receptor agonist is an amide. In some embodiments the GLP-1 receptor agonist is GLP-1(7-37) or GLP-1(7-36)amide.

In order to prolong the effect of the GLP-1 receptor agonist it is preferred that the GLP-1 receptor agonist have an extended half-life. The half-life can be determined by method known in the art an in an appropriate model, such as in Male Sprague Dawley rats or minipigs as described in WO2012/140117. Half-life in rats may be determined as in Example 39 and the half-life in minipigs may be determined as in Example 37 therein.

In some embodiments the GLP-1 receptor agonist according to the invention has a half-life above 2 hours in rat. In some embodiments the GLP-1 receptor agonist according to the invention has a half-life above 4 hours, such as above 6 hours, such as above 8 hours, such as above 10 hours, such as above 12 hours or such as above 15 hours in rat.

In some embodiments the GLP-1 receptor agonist according to the invention has a half-life above 24 hours in minipig. In some embodiments the GLP-1 receptor agonist according to the invention has a half-life above 30 hours, such as above 36 hours, such as above 42 hours, such as above 48 hours, such as above 54 hours or such as above 60 hours in minipig.

In some embodiments the GLP-1 receptor agonist has a molecular weight of at most 12 000, such as at most 7 500 Da, such as at most 5 000 Da. In some embodiments the GLP-1 receptor agonist has a molar mass of at most 10 000 g/mol, such as at most 8 000 g/mol, such as at most 6 000 g/mol.

In some embodiments the GLP-1 receptor agonist comprises one or two substituents which are covalently attached to the peptide and wherein said substituent comprises a lipophilic moiety. In some embodiments the substituent comprises a fatty acid or a fatty diacid. In some embodiments the substituent comprises a C16, C18 or C20 fatty acid. In some embodiments the substituent comprises a C16, C18 or C20 fatty diacid.

In some embodiments the substituent comprises formula (X)

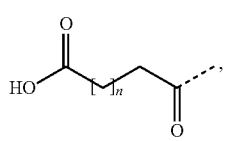

wherein n is at least 13, such as n is 13, 14, 15, 16, 17, 18 or 19. In some embodiments the substituent comprises formula (X), wherein n is in the range of 13 to 19, such as in the range of 13 to 17. In some embodiments the substituent comprises formula (X), wherein n is 13, 15 or 17. In some embodiments the substituent comprises formula (X), wherein n is 13. In some embodiments the substituent comprises formula (X), wherein n is 15. In some embodiments the substituent comprises formula (X), wherein n is 17. In some embodiments the substituent comprises formula (XIa)

HOOC—(C$_6$H$_4$)—O—(CH$_2$)$_m$—CO—* (XIa), wherein m is an integer in the range of 6-14. In some embodiments the substituent comprises formula (XIb)

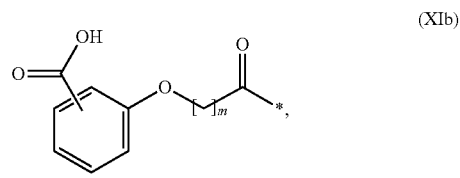

wherein the carboxy group is in position 2, 3 or 4 of the (C$_6$H$_4$) group and wherein m is an integer in the range of 8-11. In some embodiments the substituent comprises formula (XIa) or formula (XIb), wherein m is in the range of 6 to 14, such as in the range of 8 to 11. In some embodiments the substituent comprises formula (XIa) or formula (XIb), wherein m is 8, 10 or 12. In some embodiments the substituent comprises formula (XIa) or formula (XIb), wherein m is 9. In some embodiments the substituent comprises formula (XIa) or formula (XIb), wherein m is 11.

In some embodiments the substituent comprises a linker (also referred to as a spacer) located proximally in said substituent to the point of attachment between said substituent and the peptide in the GLP-1 receptor agonist. In some embodiments the substituent comprises a linker located proximally in said substituent to the point of attachment between said substituent and the peptide in said GLP-1 receptor agonist. In some embodiments the substituent comprises one or more 8-amino-3,6-dioxaoctanoic acid (OEG), such as two OEG. The one or more OEG may be a linker.

In some embodiments the substituent is [2-(2-{2-[2-(2-{2-[(S)-4-Carboxy-4-(17-carboxyheptadecanoylamino)bu-tyrylamino]ethoxy}ethoxy)acetylamino]ethoxy} ethoxy) acetyl]. In some embodiments the substituent is [2-(2-{2-[2-(2-{2-[(S)-4-carboxy-4-(17-carboxyheptadecanoy-lamino) butyrylamino]ethoxy}ethoxy)acetylamino] ethoxy}ethoxy)acetyl]. In some embodiments the substituent is [2-(2-{2-[2-(2-{2-[(S)-4-carboxy-4-({trans-4-[(19-carboxynonadecanoylamino)methyl]cyclohexanecarbonyl} amino)butyrylamino]ethoxy}ethoxy)acetylamino] ethoxy}ethoxy)acetyl]. In some embodiments the substituent is {2-[2-(2-{2-[2-(2-{(S)-4-Carboxy-4-[10-(4-carboxy-phenoxy) decanoylamino]butyrylamino}-ethoxy)ethoxy] acetylamino}ethoxy)ethoxy]acetyl}. In some embodiments the substituent is {2-[2-(2-{2-[2-(2-{(S)-4-carboxy-4-[10-(4-carboxyphenoxy) decanoylamino]butyrylamino}ethoxy) ethoxy]acetylamino}ethoxy)ethoxy]-acetyl}. In some embodiments the substituent is [2-[2-[2-[2-[2-[2-[(4S)-4-carboxy-4-[10-(4-carboxyphenoxy) decanoylamino]-bu-tanoyl]amino]ethoxy]ethoxy]acetyl]amino]ethoxy]ethoxy] acetyl].

In some embodiments the substituent comprises serum albumin, such as human serum albumin. In some embodiments the substituent comprises an immunoglobulin domain or fragment, such as a Fc domain or a modified IgG4 Fc domain.

In some embodiments the GLP-1 receptor agonist is selected from the gorup consisting of liraglutide, sema-glutide, Compound A, and Compound B. In some embodiments the GLP-1 receptor agonist is liraglutide. Liraglutide is the GLP-1 receptor agonist Arg34,Lys26-(N-epsilon-(gamma-L-glutamyl(N-alfa-hexadecanoyl)))-GLP-1(7-37). Liraglutide may be prepared as described in Example 37 of WO98/08871. In some embodiments the GLP-1 receptor agonist is semaglutide. Semaglutide is the GLP-1 receptor agonist N-epsilon26-[2-(2-{2-[2-(2-{2-[(S)-4-Carboxy-4-(17-carboxyheptadecanoylamino)butyrylamino]ethoxy}ethoxy)acetylamino]ethoxy} ethoxy)acetyl][Aib8,Arg34]GLP-1-(7-37). Semaglutide may be prepared as described in Example 4 of WO2006/097537. In some embodiments the GLP-1 receptor agonist is Compound A, which is diacylated [Aib8,Arg34,Lys37]GLP-1(7-37) as shown in Example 2 of WO2011/080103 and named $N^{\varepsilon 26}$\{2-[2-(2-{2-[2-(2-{(S)-4-Carboxy-4-[10-(4-carboxyphenoxy)decanoylamino]butyrylamino}-ethoxy)ethoxy]acetylamino}ethoxy) ethoxy]acetyl}, $N^{\varepsilon 37}$-{2-[2-(2-{2-[2-(2-{(S)-4-carboxy-4-[10-(4-carboxyphenoxy)decanoylamino] butyrylamino}ethoxy)ethoxy]acetylamino}ethoxy)ethoxy]-acetyl}-[$Aib^8$,$Arg^{34}$,$Lys^{37}$] GLP-1(7-37)-peptide. In some embodiments the GLP-1 receptor agonist is Compound B which is Diacylated [Aib8,Glu22,Arg26,Lys27,Glu30,Arg34,Lys36]-GLP-1-(7-37)-peptidyl-Glu-Gly as shown in Example 31 of WO2012/140117 and named $N^{\varepsilon 27}$-[2-[2-[2-[2-[2-[2-[[(4S)-4-carboxy-4-[10-(4-carboxyphenoxy)decanoylamino]butanoyl]amino]ethoxy]ethoxy]acetyl]amino] ethoxy]ethoxy]-acetyl], $N^{\varepsilon 36}$-[2-[2-[2-[2-[2-[2-[(4S)-4-carboxy-4-[10-(4-carboxyphenoxy) decanoylamino]-butanoyl]amino]ethoxy]ethoxy]acetyl]amino]ethoxy]ethoxy]acetyl]-[Aib8,Glu22,Arg26,Lys27, Glu30,Arg34,Lys36]-GLP-1-(7-37)-peptidyl-Glu-Gly. In some embodiments the GLP-1 receptor agonist is dulaglutide or albiglutide.

In some embodiments, the GLP-1 receptor agonist is in the form of a pharmaceutically acceptable salt, amide, or ester thereof. In some embodiments the GLP-1 receptor agonist comprises one or more pharmaceutically acceptable counter ions.

Pharmaceutical Composition

The GLP-1 receptor agonist may be administered in the form of a pharmaceutical composition. The pharmaceutical composition may be in a liquid or solid form.

Parenteral Administration

The pharmaceutical composition may comprise the GLP-1 receptor agonist in a concentration from 0.1 mg/ml to 100 mg/ml. In some embodiments the pharmaceutical composition comprises 0.01-50 mg/ml, or 0.01-20 mg/ml, or 0.01-10 mg/ml GLP-1 receptor agonist. In some embodiments the pharmaceutical composition comprises 0.1-20 mg/ml GLP-1 receptor agonist.

The pharmaceutical compositions described herein may further comprise one or more pharmaceutically acceptable excipients, for example selected from the group consisting of buffer system, preservative, tonicity agent, chelating agent, stabilizer and surfactant. In some embodiments the pharmaceutical composition comprises one or more pharmaceutically acceptable excipients, such as one or more selected from the group consisting of a buffer, an isotonic agent, and a preservative. The formulation of pharmaceutically active ingredients with various excipients is known in the art, see e.g. Remington: The Science and Practice of Pharmacy (e.g. 19th edition (1995), and any later editions). The term "excipient" broadly refers to any component other than the active therapeutic ingredient(s), e.g. the GLP-1 receptor agonist. The excipient may be an inert substance, an inactive substance, and/or a not medicinally active substance.

In some embodiments the pharmaceutical composition has a pH in the range of 7.0-10.0, such as 7.0 to 9.5 or 7.2 to 9.5. In some embodiments the pharmaceutical composition has a pH in the range of 7.0-8.5, such as 7.0 to 7.8 or 7.8 to 8.2. In some embodiments the pharmaceutical composition has a pH of 7.4. In some embodiments the pharmaceutical composition has a pH of 8.15. In some embodiments the pharmaceutical composition comprises a phosphate buffer, such as a sodium phosphate buffer, e.g. disodium phosphate. In some embodiments the pharmaceutical composition comprises an isotonic agent, such as propylene glycol. In some embodiments the pharmaceutical composition comprises a preservative, such as phenol.

The pharmaceutical composition may be in the form of a solution or a suspension. In some embodiments the pharmaceutical composition is aqueous composition, such as an aqueous solution or an aqueous suspension. The term "aqueous composition" is defined as a composition comprising at least 50% w/w water. Likewise, the term "aqueous solution" is defined as a solution comprising at least 50% w/w water, and the term "aqueous suspension" is defined as a suspension comprising at least 50% w/w water. An aqueous composition may comprise at least 50% w/w water, or at least 60%, 70%, 80%, or even at least 90% w/w of water.

In some embodiments the GLP-1 receptor agonist is administered in the form of a pharmaceutical composition comprising about 0.1-20 mg/ml GLP-1 receptor agonist, about 2-15 mM phosphate buffer, about 2-25 mg/ml propylene glycol, and has a pH in the range of 7.0-9.0. In some embodiments the GLP-1 receptor agonist is administered in the form of a pharmaceutical composition comprising about 0.1-20 mg/ml GLP-1 receptor agonist, about 2-15 mM phosphate buffer, about 2-25 mg/ml propylene glycol, about 1-18 mg/ml phenol, and has a pH in the range of 7.0-9.0. In some embodiments the GLP-1 receptor agonist (e.g. semaglutide) is administered in the form of a pharmaceutical composition comprising about 1.34 mg/ml GLP-1 receptor agonist (e.g. semaglutide), about 1.42 mg/ml disodium phosphate dihydrate, about 14.0 mg/ml propylene glycol, about 5.5 mg/ml phenol, and has pH of about 7.4. In some embodiments the GLP-1 receptor agonist (e.g. semaglutide) is administered in the form of a pharmaceutical composition comprising 1.34 mg/ml GLP-1 receptor agonist, 1.42 mg/ml disodium phosphate dihydrate, 14.0 mg/ml propylene glycol, 5.5 mg/ml phenol, and has pH of 7.4. In some embodiments the GLP-1 receptor agonist (e.g. liraglutide) is administered in the form of a pharmaceutical composition comprising GLP-1 receptor agonist (e.g. 3-8 mg/ml), disodium phosphate dihydrate, propylene glycol, phenol, and has pH of about 8.0-8.3. In some embodiments the GLP-1 receptor agonist (e.g. liraglutide) is administered in the form of a pharmaceutical composition comprising GLP-1 receptor agonist (e.g. about 6.0 mg/ml), disodium phosphate dihydrate, propylene glycol, phenol, and has pH of about 8.15.

Oral Administration

The solid composition may be a solid composition suited for administration by the oral route as described further herein. In some embodiments the solid composition comprises at least one pharmaceutically acceptable excipient. The term "excipient" as used herein broadly refers to any component other than the active therapeutic ingredient(s) or active pharmaceutical ingredient(s) (API(s)). The excipient may be a pharmaceutically inert substance, an inactive substance, and/or a therapeutically or medicinally none active substance. The excipient may serve various purposes, e.g. as a carrier, vehicle, filler, binder, lubricant, glidant, disintegrant, flow control agent, crystallization inhibitors solubilizer, stabilizer, colouring agent, flavouring agent, surfactant, emulsifier or combinations of thereof and/or to improve administration, and/or absorption of the therapeutically active substance(s) or active pharmaceutical ingredient(s). The amount of each excipient used may vary within ranges conventional in the art. Techniques and excipients which may be used to formulate oral dosage forms are described in Handbook of Pharmaceutical Excipients, 8th edition, Sheskey et al., Eds., American Pharmaceuticals Association and the Pharmaceutical Press, publications department of the Royal Pharmaceutical Society of Great Britain (2017); and Remington: the Science and Practice of Pharmacy, 22nd edition, Remington and Allen, Eds., Pharmaceutical Press (2013). In some embodiments the excipients may be selected from binders, such as polyvinyl pyrrolidone (povidone), etc.; fillers such as cellulose powder, microcrystalline cellulose, cellulose derivatives like hydroxymethylcellulose, hydroxyethylcellulose, hydroxypropylcellulose and hydroxy-propylmethylcellulose, dibasic calcium phosphate, corn starch, pregelatinized starch, etc.; lubricants and/or glidants such as stearic acid, magnesium stearate, sodium stearylfumarate, glycerol tribehenate, etc.; flow control agents such as colloidal silica, talc, etc.; crystallization inhibitors such as Povidone, etc.; solubilizers such as Pluronic, Povidone, etc.; colouring agents, including dyes and pigments such as iron oxide red or yellow, titanium dioxide, talc, etc.; pH control agents such as citric acid, tartaric acid, fumaric acid, sodium citrate, dibasic calcium phosphate, dibasic sodium phosphate, etc.; surfactants and emulsifiers such as Pluronic, polyethylene glycols, sodium carboxymethyl cellulose, polyethoxylated and hydrogenated castor oil, etc.; and mixtures of two or more of these excipients and/or adjuvants.

The solid composition may comprise a binder, such as povidone; starches; celluloses and derivatives thereof, such as microcrystalline cellulose, e.g., Avicel PH from FMC (Philadelphia, PA), hydroxypropyl cellulose hydroxylethyl cellulose and hydroxylpropylmethyl cellulose METHOCEL from Dow Chemical Corp. (Midland, MI); sucrose; dextrose; corn syrup; polysaccharides; and gelatin. The binder may be selected from the group consisting of dry binders and/or wet granulation binders. Suitable dry binders are, e.g., cellulose powder and microcrystalline cellulose, such as Avicel PH 102 and Avicel PH 200. In some embodiments the solid composition comprises Avicel, such as Aavicel PH 102. Suitable binders for wet granulation or dry granulation are corn starch, polyvinyl pyrrolidone (povidon), vinylpyrrolidone-vinylacetate copolymer (copovidone) and cellulose derivatives like hydroxymethylcellulose, hydroxyethylcellulose, hydroxypropylcellulose and hydroxyl-propylmethylcellulose. In some embodiments the solid composition comprises povidone.

In some embodiments the solid composition comprises a filler which may be selected from lactose, mannitol, erythritol, sucrose, sorbitol, calcium phosphate, such as calcium-hydrogen phosphate, microcrystalline cellulose, powdered cellulose, confectioner's sugar, compressible sugar, dextrates, dextrin and dextrose. In some embodiments the solid composition comprises microcrystalline cellulose, such as Avicel PH 102 or Avicel PH 200.

In some embodiments the solid composition comprises a lubricant and/or a glidant. In some embodiments the composition comprises a lubricant and/or a glidant, such as talc, magnesium stearate, calcium stearate, zinc stearate, glyceryl behenate, glyceryl debehenate, behenoyl polyoxyl-8 glycerides, polyethylene oxide polymers, sodium lauryl sulfate, magnesium lauryl sulfate, sodium oleate, sodium stearyl fumarate, stearic acid, hydrogenated vegetable oils, silicon dioxide and/or polyethylene glycol etc. In some embodiments the solid composition comprises magnesium stearate or glyceryl debehenate (such as the product Compritol® 888 ATO).

In some embodiments the solid composition comprises a disintegrant, such as sodium starch glycolate, polacrilin potassium, sodium starch glycolate, crospovidon, croscarmellose, sodium carboxymethylcellulose or dried corn starch. The solid composition may comprise one or more surfactants, for example a surfactant, at least one surfactant, or two different surfactants. The term "surfactant" refers to any molecules or ions that are comprised of a water-soluble (hydrophilic) part, and a fat-soluble (lipophilic) part. The surfactant may e.g. be selected from the group consisting of anionic surfactants, cationic surfactants, nonionic surfactants, and/or zwitterionic surfactants.

The solid composition may further comprise a delivery agent or absorption enhancer is for the present invention an excipient capable of increasing the oral exposure of the GLP-1 receptor agonist. The delivery agent may be a salt of N-(8-(2-hydroxybenzoyl)amino)caprylic acid (also referred to herein as a salt of NAC), which contains the anion N-(8-(2-hydroxybenzoyl)amino)caprylate. The structural formula of N-(8-(2-hydroxybenzoyl)amino)caprylate is shown in formula (I).

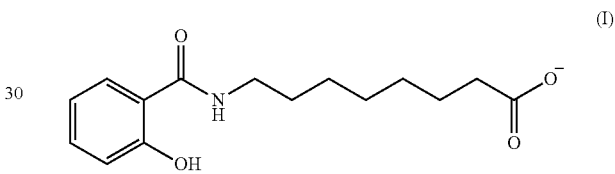

(I)

In some embodiments the salt of N-(8-(2-hydroxybenzoyl)amino)caprylic acid comprises one monovalent cation, two monovalent cations or one divalent cation. In some embodiments the salt of N-(8-(2-hydroxybenzoyl)amino) caprylic acid is selected from the group consisting of the sodium salt, potassium salt and/or calcium salt of N-(8-(2-hydroxybenzoyl)amino)caprylic acid. In some embodiments the salt of N-(8-(2-hydroxybenzoyl)amino)caprylic acid is selected from the group consisting of the sodium salt, potassium salt and/or the ammonium salt. In some embodiments the salt of N-(8-(2-hydroxybenzoyl)amino)caprylic acid is the sodium salt or the potassium salt. Salts of N-(8-(2-hydroxybenzoyl)amino)caprylate may be prepared using the method described in e.g. WO96/030036, WO00/046182, WO01/092206 or WO2008/028859. The salt of N-(8-(2-hydroxybenzoyl)amino)caprylic acid may be crystalline and/or amorphous. In some embodiments the delivery agent comprises the anhydrate, monohydrate, dihydrate, trihydrate, a solvate or one third of a hydrate of the salt of N-(8-(2-hydroxybenzoyl)amino)caprylic acid as well as combinations thereof. In some embodiments the delivery agent is a salt of N-(8-(2-hydroxybenzoyl)amino)caprylic acid as described in WO2007/121318. In some embodiments the delivery agent is sodium N-(8-(2-hydroxybenzoyl)amino)caprylate (referred to as "SNAC" herein), also known as sodium 8-(salicyloylamino)octanoate.

In some embodiments the composition for use in the invention is in the form of a solid composition, such as a tablet, for oral administration.

In some embodiments the solid composition comprises the GLP-1 receptor agonist in an amount in the range of 0.1-50 mg, such as 0.5 to 40 mg or 1-30 mg. In some embodiments the solid composition comprises the GLP-1 receptor agonist in an amount in the range of 2-20 mg, such as 3-18 mg or 5-15 mg. In some embodiments the solid composition comprises the GLP-1 receptor agonist in an amount of about 3 mg, such as about 7 mg or about 14 mg.

In some embodiments least 30% (w/w) of the solid composition (e.g. tablet) is a salt of N-(8-(2-hydroxybenzoyl)amino)caprylic acid. In some embodiments least 50% (w/w) of the solid composition (e.g. tablet) is a salt of N-(8-(2-hydroxybenzoyl)amino)caprylic acid. In some embodiments the amount of the salt of N-(8-(2-hydroxybenzoyl)amino)caprylic acid per dose unit of the composition is in the range of 0.20-. 5 mmol, 0.25-1.0 mmol, 0.30-0.75 mmol, or such as 0.45-0.65 mmol. In some embodiments the amount of SNAC in the composition is in the range of 75-600 mg. In some embodiments the amount of SNAC in the composition is in the range of 75-400 mg, such as from 80-350 mg, such as from about 100 to about 300 mg per dose unit.

In some embodiments the solid composition comprises a lubricant, such as magnesium stearate. In some embodiments a unit dose of the solid composition comprises: 0.1-50 mg GLP-1 receptor agonist, 25-600 mg salt of N-(8-(2-hydroxybenzoyl)amino)caprylic acid (NAC) (such as the sodium salt of NAC (SNAC)), and 0-25 mg lubricant.

Administration Regimen

GLP-1 receptor agonist may be administered in a therapeutically effective amount, such as an amount therapeutically effective to treat type 2 diabetes. The therapeutically effective amount of GLP-1 receptor agonist can be assessed by a medical doctor. The dosage of GLP-1 receptor agonist may be in the range from 0.01 to 50 mg, such as 1-30 mg or 3-20 mg. In some embodiments the GLP-1 receptor agonist is administered at any time in the day.

The GLP-1 receptor agonist, such as semaglutide, may be administered once weekly or more frequent, such as once daily.

In some embodiments the GLP-1 receptor agonist is administered in an amount in the range of 0.05-30 mg per week, such as 0.5 or 1.0 mg per week, optionally by once weekly administration. In some embodiments the GLP-1 receptor agonist is administered in an amount of at least 0.1 mg per week, such as at least 0.5 mg per week or at least 1 mg per week, optionally by once weekly administration. In some embodiments the GLP-1 receptor agonist is administered in an amount of no more than 25 mg per week, such as no more than 20 mg per week or no more than 15 mg per week, optionally by once weekly administration. In some embodiments the GLP-1 receptor agonist is administered in an amount of no more than 10 mg per week, such as no more than 6 mg per week or no more than 3 mg per week, optionally by once weekly administration. In some embodiments the GLP-1 receptor agonist is administered once weekly in an amount of 0.5 or 1.0 mg.

In some embodiments the method of the invention reduces the risk of mortality.

In some embodiments the administration of a GLP-1 receptor agonist is a chronic treatment in which semaglutide is administered for at least 12 months, such as for at least 16 months or at least 18 months.

Parenteral Administration

The GLP-1 receptor agonist may be administered via parenteral administration, for example subcutaneous injection. GLP-1 receptor agonist may be administered using a pen-injector, such as a 3 ml disposable pen-injector.

In some embodiments the dosage of GLP-1 receptor agonist is in the range from 0.1 to 5.0 mg, such as in the range from 0.1 to 3.0 mg. In some embodiments the daily dosage of GLP-1 receptor agonist is selected from the group consisting of 0.5 and 1.0 mg.

Oral Administration

The GLP-1 receptor agonist may be administered orally, for example in the form of a tablet, a coated tablet, a sachet or a capsule such as hard or soft gelatine capsule and all such compositions are considered solid oral dosage forms. Oral administration may be once daily administration. In some embodiments the dosage of the GLP-1 receptor agonist is in the range from 1 to 30 mg, such as 2 to 20 mg or 3 to 15 mg. In some embodiments the dosage of GLP-1 receptor agonist is 3, 7 or 14 mg. The composition may be in the form of a dose unit, such as tablet. In some embodiments the weight of the unit dose is in the range of 50 mg to 1000 mg, such as in the range of 50-750 mg, or such as about 100-500 mg. In some embodiments the weight of the dose unit is in the range of 75 mg to 350 mg, such as in the range of 50-300 mg or 100-400 mg. The tablet for oral administration may comprise 30% (w/w) salt of N-(8-(2-hydroxybenzoyl)amino)caprylic acid, such as the sodium salt of N-(8-(2-hydroxybenzoyl)amino)caprylic acid (SNAC). In some embodiments the composition may be granulated prior to being compressed to tablets. The composition may comprise a granular part and/or an extra-granular part, wherein the granular part has been granulated and the extra-granular part has been added after granulation. The GLP-1 receptor agonist may be included in the granular part or the extra-granular part. In some embodiments the extra-granular part comprises the GLP-1 receptor agonist. In an embodiment the extra-granular part may further comprise a lubricant and/or a glidant. In an embodiment the granular part may comprise a lubricant and/or a glidant. In an embodiment the granular part and the extra-granular part comprise a lubricant and/or a glidant.

In some embodiments, the GLP-1 receptor agonist is the sole pharmaceutically active ingredient administered according to the present invention. In some embodiments, the GLP-1 receptor agonist is combined with one or more further pharmaceutically active ingredients in the present invention. In some embodiments, the GLP-1 receptor agonist is combined with one or more further pharmaceutically active ingredients selected from the group consisting of rivastigmin, menantine (such as menantine hydrochloride), donepezil and galantamine. In some embodiments, the GLP-1 receptor agonist is combined with rivastigmin. In some embodiments, the GLP-1 receptor agonist is combined with menantine, such as menantine hydrochloride. In some embodiments, the GLP-1 receptor agonist is combined with donepezil. In some embodiments, the GLP-1 receptor agonist is combined with galantamine.

In some embodiments the term "chronic treatment" as used herein with reference to the GLP-1 receptor agonist means administration in an amount and frequency to provide a therapeutic effect. In some embodiments the term "chronic treatment" as used herein with reference to GLP-1 receptor agonist means once weekly administration of 0.1-3.0 mg, such as 0.5 or 1.0 mg, GLP-1 receptor agonist (e.g. semaglutide). In some embodiments the term "chronic treatment" as used herein with reference to a GLP-1 receptor agonist means once daily administration of 0.05-0.3 mg, such as 0.05, 0.1, 0.2, or 0.3 mg, GLP-1 receptor agonist (e.g. semaglutide). In some embodiments the term "chronic treatment" as used herein with reference to a GLP-1 receptor agonist means once daily administration of 0.1-6 mg, such as 0.5-4 mg, GLP-1 receptor agonist (e.g. liraglutide). The term "chronic treatment" as used herein may refer to administration of a drug according to a prescribed dosage regimen (for example once weekly administration) for a long period of time (for example at least 2 years or at least 5 years) wherein up to 10%, such as up to 5%, of dosages may be missed; provided that no more than 10 consecutive dosages are missed.

Unless otherwise stated, ranges herein include their end points. In some embodiments the term "a" means "one or more". In some embodiments, and unless otherwise indicated in the specification, terms presented in singular form also include the plural situation. Herein the term "about" means±10% of the value referred to, and includes the value.

Non-Limiting Embodiments of the Invention

Non-limiting embodiments of the invention include:
1. A method for the treatment of dementia, wherein said method comprises administering a GLP-1 receptor agonist to a subject in need thereof and said subject has metabolic syndrome.
2. A method for the treatment of dementia, wherein said method comprises administering semaglutide to a subject in need thereof.
3. A method for reducing the risk of developing dementia, wherein said method comprises administering a GLP-1 receptor agonist to a human subject in need thereof and said subject has one or more indications selected from the group consisting of pre-diabetes, diabetes, cardiovascular disease, obesity, and hypertension.
4. A method for reducing the risk of developing dementia, wherein said method comprises administering a GLP-1 receptor agonist to a subject in need thereof and said subject has metabolic syndrome.
5. A method for reducing the risk of developing dementia, wherein said method comprises administering a GLP-1 receptor agonist to a subject in need thereof and said subject has one or more indications selected from the group consisting of pre-diabetes, diabetes, cardiovascular disease, obesity, and hypertension.
6. A method for reducing the risk of developing dementia, wherein said method comprises administering semaglutide to a subject in need thereof.
7. The method according to any one of the preceding embodiments, wherein treatment is reducing the risk of developing dementia.
8. The method according to any one of the preceding embodiments, wherein said metabolic syndrome is one or more indications selected from the group consisting of pre-diabetes, diabetes, cardiovascular disease, obesity, and hypertension.
9. The method according to any one of the preceding embodiments, wherein said subject has pre-diabetes.
10. The method according to any one of the preceding embodiments, wherein said subject has diabetes.
11. The method according to any one of the preceding embodiments, wherein said subject has cardiovascular disease.
12. The method according to any one of the preceding embodiments, wherein said subject has obesity.
13. The method according to any one of the preceding embodiments, wherein said subject has hypertension.
14. The method according to any one of the preceding embodiments, wherein said GLP-1 receptor agonist comprises GLP-1(7-37) (SEQ ID No: 1) optionally comprising one or more substitutions, deletions, additions and/or modifications.
15. The method according to any one of the preceding embodiments, wherein said GLP-1 receptor agonist comprises a maximum of 12 amino acids which have been altered, e.g., by substitution, deletion, insertion and/or modification, compared to GLP-1(7-37) (SEQ ID No: 1).
16. The method according to any one of the preceding embodiments, wherein said GLP-1 receptor agonist comprises a maximum of 10 amino acids which have been altered, e.g., by substitution, deletion, insertion and/or modification, compared to GLP-1(7-37) (SEQ ID No: 1).
17. The method according to any one of the preceding embodiments, wherein said GLP-1 receptor agonist comprises a maximum of 8 amino acids which have been altered, e.g., by substitution, deletion, insertion and/or modification, compared to GLP-1(7-37) (SEQ ID No: 1).
18. The method according to any one of the preceding embodiments, wherein said GLP-1 receptor agonist comprises a maximum of 6 amino acids which have been altered, e.g., by substitution, deletion, insertion and/or modification, compared to GLP-1(7-37) (SEQ ID No: 1).
19. The method according to any one of the preceding embodiments, wherein said GLP-1 receptor agonist comprises one or more substituents.
20. The method according to any one of the preceding embodiments, wherein said substituent comprises a linker, such as one or more OEG.
21. The method according to any one of the preceding embodiments, wherein said linker is located proximally in said substituent to the point of attachment between said substituent and the peptide in said GLP-1 receptor agonist.
22. The method according to any one of the preceding embodiments, wherein said GLP-1 receptor agonist has an EC50 (without HSA) of at most 500 pM.
23. The method according to any one of the preceding embodiments, wherein said GLP-1 receptor agonist is no more than 12 kDa.
24. The method according to any one of the preceding embodiments, wherein said GLP-1 receptor agonist is selected from the group consisting of liraglutide, semaglutide, Compound A and Compound B.
25. The method according to any one of the preceding embodiments, wherein said GLP-1 receptor agonist is liraglutide.
26. The method according to any one of the preceding embodiments, wherein said GLP-1 receptor agonist is semaglutide.
27. The method according to any one of the preceding embodiments, wherein said GLP-1 receptor agonist is Compound A.
28. The method according to any one of the preceding embodiments, wherein said GLP-1 receptor agonist is Compound B.
29. The method according to any one of the preceding embodiments, wherein said GLP-1 receptor agonist is dulaglutide.
30. The method according to any one of the preceding embodiments, wherein said GLP-1 receptor agonist is albiglutide.

31. The method according to any one of the preceding embodiments, wherein said subject is human.
32. The method according to any one of the preceding embodiments, wherein said dementia is all forms and all stages in the dementia disease continuum.
33. The method according to any one of the preceding embodiments, wherein said dementia is mild cognitive impairment.
34. The method according to any one of the preceding embodiments, wherein said dementia is Alzheimer's disease.
35. The method according to any one of the preceding embodiments, wherein said dementia is selected from the group consisting of preclinical Alzheimer's disease, mild cognitive impairment of the Alzheimer's type, early onset familial Alzheimer's disease, and prodromal Alzheimer's disease.
36. The method according to any one of the preceding embodiments, wherein said dementia is preclinical Alzheimer's disease.
37. The method according to any one of the preceding embodiments, wherein said dementia is mild cognitive impairment of the Alzheimer's type.
38. The method according to any one of the preceding embodiments, wherein said dementia is early onset familial Alzheimer's disease.
39. The method according to any one of the preceding embodiments, wherein said dementia is prodromal Alzheimer's disease.
40. The method according to any one of the preceding embodiments, wherein said GLP-1 receptor agonist is the sole pharmaceutically active ingredient administered to said subject.
41. The method according to any one of the preceding embodiments, wherein said GLP-1 receptor agonist is administered subcutaneously.
42. The method according to the preceding embodiment, wherein said GLP-1 receptor agonist is administered in a composition which is in the form of a solution or suspension.
43. The method according to the preceding embodiment, wherein said composition comprises at least 90% water.
44. The method according to any one of the preceding embodiments, wherein said GLP-1 receptor agonist is semaglutide, is administered subcutaneously, and is in the form of a solution comprising at least 90% water and with pH in the range of 7.0-9.0.
45. The method according to any one of the preceding embodiments, wherein said GLP-1 receptor agonist is administered orally.
46. The method according to the preceding embodiment, wherein said GLP-1 receptor agonist is administered in the form of a tablet.
47. The method according to the preceding embodiment, wherein at least 30% (w/w) of said tablet is a salt of N-(8-(2-hydroxybenzoyl)amino)caprylic acid.
48. The method according to the preceding embodiment, wherein at least 50% (w/w) of said tablet is a salt of N-(8-(2-hydroxybenzoyl)amino)caprylic acid.
49. The method according to the preceding embodiment, wherein said salt of N-(8-(2-hydroxybenzoyl)amino) caprylic acid is SNAC.
50. The method according to any one of the preceding embodiments, wherein said subject has previously been administered insulin.
51. The method according to any one of the preceding embodiments, wherein said method reduces the risk of mortality for said subject.
52. The method according to any one of the preceding embodiments, wherein said administration of a GLP-1 receptor agonist is a chronic treatment in which semaglutide is administered for at least 12 months, such as for at least 16 months or at least 18 months.

EXAMPLES

Example 1—Reduced Risk of Dementia in Subjects With Metabolic Syndrome

Methods

Exposure to GLP-1 receptor agonist and subsequent diagnosis of dementia was assessed in data sources with long term treatment exposure including three pooled double-blind randomized controlled trials (RCTs) and a nationwide cohort of patients with diabetes. This was done with the aim of investigating whether use of GLP-1 receptor agonists reduces the onset of dementia in patients with diabetes.

Trials and Registries

A triangulation approach integrating study designs and data sources with different key sources of potential bias was employed to obtain a more reliable answer. First, data was pooled from three large RCTs with GLP-1 receptor agonists; liraglutide (LEADER; 9,340 patients), subcutaneous semaglutide (SUSTAIN-6; 3,297 patients), and oral semaglutide (PIONEER 6; 3,183 patients). All three trials were multi-center, double-blind, placebo-controlled cardiovascular outcomes trials. Patients with type 2 diabetes at high risk for or with established cardiovascular disease were randomly assigned in a 1:1 ratio, to receive placebo or liraglutide (LEADER), or semaglutide (SUSTAIN-6; PIONEER 6) in addition to standard of care. In these trials, the treatment for diabetes (excluding GLP-1 receptor agonists, dipeptidyl peptidase-4 inhibitors (DPP4 inhibitors), and pramlintide) was adjusted or added in both arms, at the investigator's discretion, as previously described. The formulation tested in LEADER was an aqueous composition comprising liraglutide, disodium phosphate dihydrate, propylene glycol, and phenol at pH 8.15. The formulation tested in SUSTAIN-6 was an aqueous composition comprising semaglutide, disodium phosphate dihydrate, propylene glycol, and phenol at pH 7.4. The formulation tested in PIONEER was a tablet comprising semaglutide and SNAC.

Next, we used the Danish National Prescription Register, which holds information on all redeemed prescriptions in Denmark since Jan. 1, 1995 (Table S1), to identify a nationwide cohort of patients treated for diabetes. We identified everyone with a first prescription of a second line diabetes treatment (Table S2) between Jan. 1, 1995 and Dec. 31, 2017.

Figure 4:
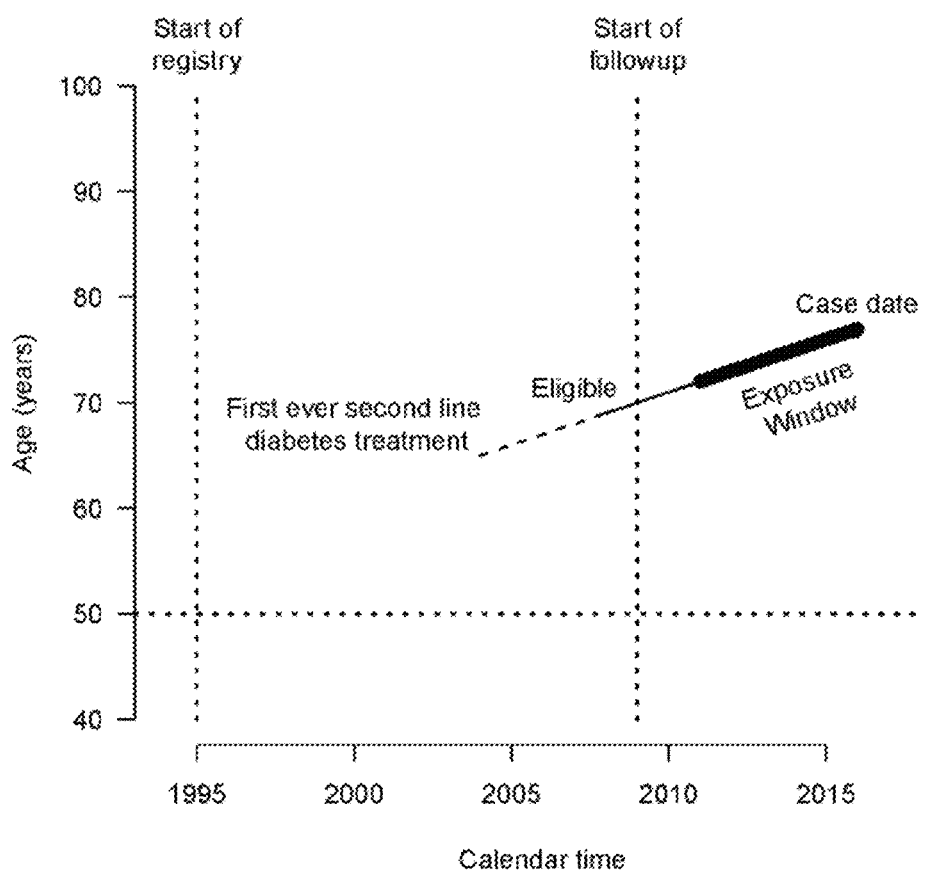
FIG. 4 shows study design used in the nationwide cohort. *First ever second-line diabetes treatment=first treatment with diabetes treatment not including metformin, eligible=eligible for cohort of diabetes patients, case date=date of dementia diagnosis with matching of each case to ten controls without dementia, exposure window 5-year window prior to case date, where duration of cumulative diabetes treatment is assessed.

Follow-up for onset of dementia started on Jan. 1, 2009 (FIG. 4), as this was when GLP-1 receptor agonists could be considered a well-known and available treatment for diabetes in Denmark. To correctly identify patients with a first ever prescription for a second line diabetes treatment, we excluded those who had a prescription between Jan. 1, 1995 through Jun. 30, 1995. Furthermore, patients with established dementia before start of follow-up or who developed dementia before age 50 were excluded.

For the main analysis we included everyone with at least 5 years of exposure to second line diabetes treatment.

Exposure to GLP-1 Receptor Agonists

The predefined treatment durations for the 3 RCTs are listed in Supplementary Table S4. In the nationwide cohort, all dispensed prescriptions for GLP-1 receptor agonists were identified (Table S2), and years of cumulative GLP-1 receptor agonist exposure were updated throughout the follow-up period. Patients were considered exposed if they had redeemed at least 1 prescription for any GLP-1 receptor agonists. The exposure duration was accumulated according to 6 months long intervals, in which at least 1 prescription was redeemed.

Exposure to Other Diabetes Treatments

In the nationwide cohort, "other second line diabetes treatments" were assessed to test whether or not a potential influence of GLP-1 receptor agonists on dementia prevention was specific for treatment with GLP-1 receptor agonists. We identified other second line diabetes treatment that were available as alternative treatment options to GLP-1 receptor agonists during the follow-up period, i.e. insulin, sulfonylureas, DPP4 inhibitors, acarbose, and meglitinides (Table S2). Exposure time was accumulated according to six months long intervals, in which at least 1 prescription was redeemed. Monotherapy with metformin was not assessed, since this is considered first-line treatment for diabetes and thus not a comparable treatment option to GLP-1 receptor agonists.

Dementia

In the RCTs, the Standardized Medical Dictionary for Regulatory Activities (MedDRA, version 21.1) was used to identify dementia-related adverse events using the narrow scope search terms for dementia (Table S3). In the nationwide cohort, dementia was defined as a diagnosis of dementia in the National Patient Register or first ever prescription for approved dementia specific treatment in the National Prescription Register (cholinesterase inhibitors and memantine) (Table S1 and S2 lists the ICD10 and ATC codes).

Statistical Analysis

For the pooled RCTs, an intention-to-treat analysis was performed using Cox regression with treatment assignment as the only explanatory variable to determine the hazard ratio for developing dementia with GLP-1 receptor agonists versus placebo. We reported the hazard ratio for dementia for patients randomized to a GLP-1 receptor agonist versus placebo. The incidence of dementia with death as competing risk was calculated using the Aalen-Johansen estimator.

In the nationwide cohort we employed a nested case-control study design where each patient at case date (date of dementia diagnosis) was matched on age, sex and calendar date to 10 controls without dementia. The effects of differences in cumulative exposure to GLP-1 receptor agonists for developing dementia were modelled with Cox regression in a 5 year exposure window prior to case date (FIG. 4) and reported as hazard ratios for each 1 year increase in GLP-1 receptor agonist exposure for cases versus controls. Reported were hazard ratios for each 1 year increase in duration of. The model was adjusted for age, sex, and calendar date via matching, and information on diabetes duration (years since first ever prescription of any second line diabetes treatment), stroke, myocardial infarction, hypertension, chronic renal disease, and educational attainment (Table S1 and S2) at the start of the exposure window. A similar Cox regression model was employed for each of the other second line diabetes treatments. Furthermore, the hazard ratio for dementia with exposure to GLP-1 receptor agonists was investigated across subgroups, including sex, age, insulin exposure, and cardiovascular status, where cardiovascular disease was defined as prior stroke or myocardial infarction. In the nationwide cohort, prespecified sensitivity analyses were performed to determine the effect of 1) reverse causation, where exposure two years before the case date was ignored; 2) diabetes duration defined as "time since first treatment with metformin or second line diabetes treatment; 3) shortening and lengthening the exposure windows (3- and 10-years, respectively); 4) adjustment only via matching on age, sex, and calendar date and 5) competing risk of death. The level of statistical significance was set at 5%.

Results

Study Populations

In total, 15,820 patients at high risk for or with established cardiovascular disease were randomized to a GLP-1 receptor agonist or placebo in the pooled RCTs. Baseline characteristics are presented in Table 1.

In the nationwide cohort of 120,054 patients with at least 5 years since initiation of a second line diabetes treatments, 4,849 patients developed dementia during the follow-up period from 2009 through 2017. Characteristics of case and control patients are presented in Table 2. Liraglutide comprised 95% of all prescriptions for GLP-1 receptor agonists.

Dementia in Pooled RCTs

In the pooled RCTs, 15 patients randomized to a GLP-1 receptor agonist and 32 patients randomized to placebo developed dementia during a median follow-up of 3.61 years (Table S4).

Patients randomized to GLP-1 receptor agonists had a lower risk of developing dementia compared to those randomized to placebo (hazard ratio 0.47; 95% confidence interval (CI), 0.25 to 0.86) (FIG. 1 and Table S5). The beneficial effects of GLP-1 receptor agonists became apparent after 12 months of treatment (FIG. 1).

Dementia in the Nationwide Cohort

Figure 2:
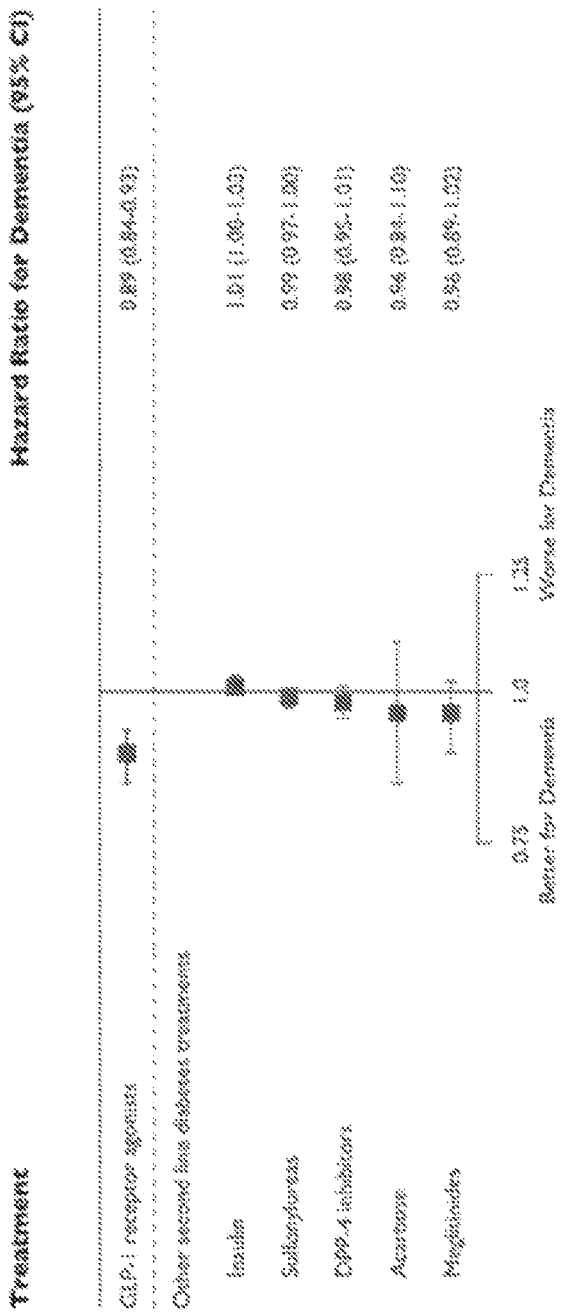
FIG. 2 shows hazard ratios for dementia with each 1 year increase in exposure duration to GLP-1 receptor agonists and other second-line diabetes treatments in the nationwide cohort. Cox proportional hazards regression models conducted for exposure to each treatment. Estimates denote the hazard ratio for a 1 year increase in duration of exposure. The models were adjusted for history of stroke, myocardial infarction, hypertension, educational attainment, and diabetes duration. Sex, age, and calendar date were included via matching.
Figure 3:
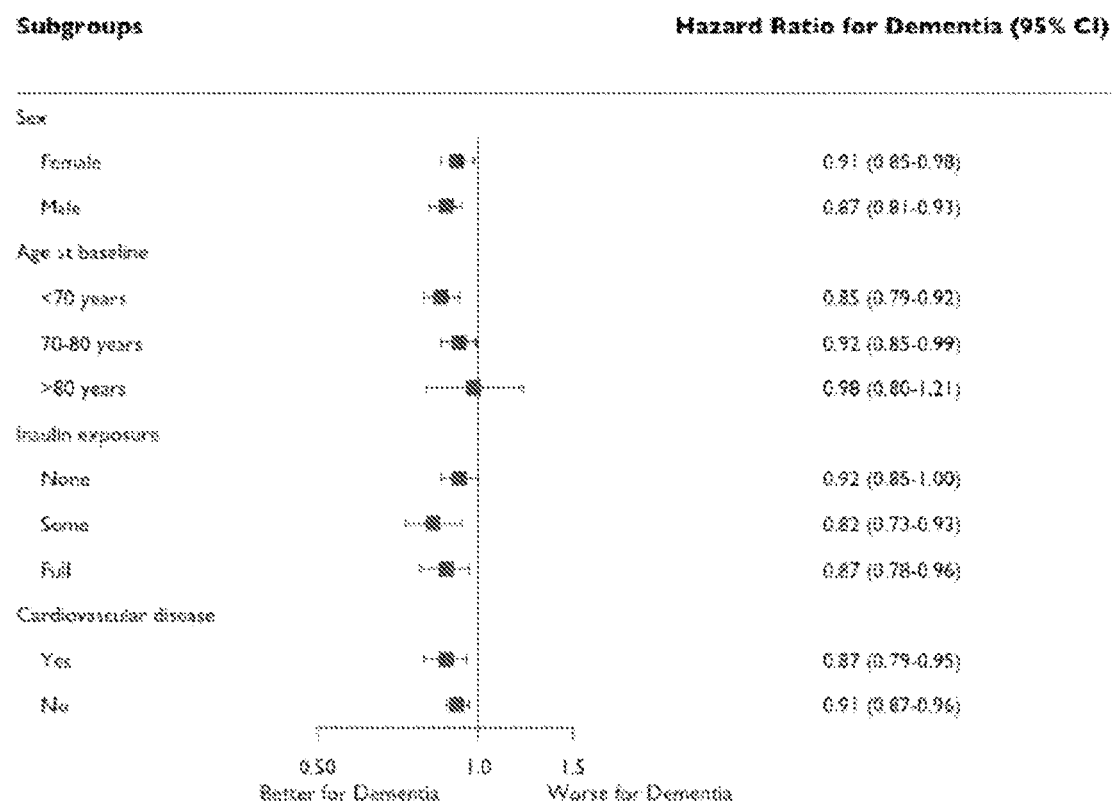
FIG. 3 shows hazard ratios for dementia with each 1 year increase in exposure duration to GLP-1 receptor agonists according to subgroup in the nationwide cohort. Cox proportional hazards regression models conducted for exposure to GLP-1 in various subgroups. Estimates denote the hazard ratio for a 1 year increase in duration of exposure. The models were adjusted for history of stroke, myocardial infarction, hypertension, educational attainment, and diabetes duration. Sex, age, and calendar date were included via matching.

The median follow-up time in the nationwide cohort was 7.4 years. The analysis nested in the nationwide cohort was specifically designed to examine long term effects by ensuring at least 5 years of treatment with second line diabetes therapy. The result was a reduction of hazard of dementia with increasing duration of GLP-1 receptor agonist exposure (FIG. 2). Exposure to other second line diabetes treatments was not found to be associated with a decrease in hazard ratio (FIG. 2). The reduction in hazard ratio for dementia with exposure to GLP-1 receptor agonists was similar across subgroups stratified by sex, age, co-exposure to insulin, and cardiovascular status (FIG. 3).

Figure 5A:
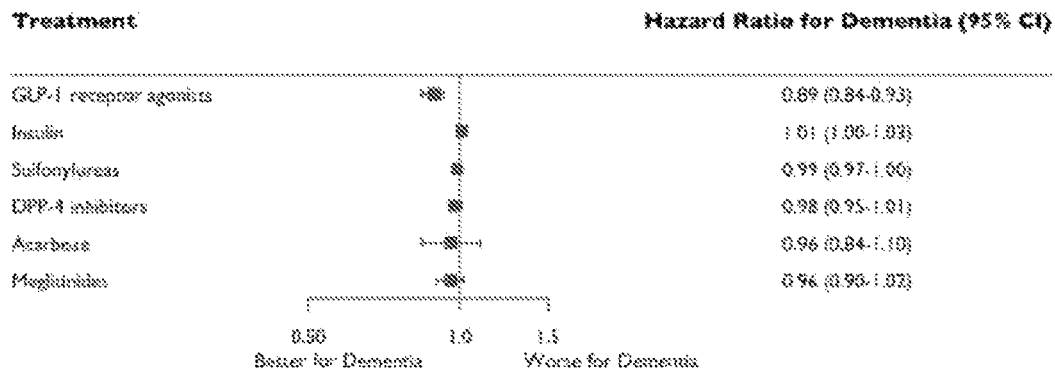
FIG. 5A shows hazard ratios for dementia with each 1 year increase in exposure duration to GLP-1 receptor agonists and other second-line diabetes. Treatments in the Nationwide Cohort Excluding the Last 2 Years Prior to Case Date. Cox proportional hazards regression models conducted for exposure to each treatment. Estimates denote the hazard ratio for a 1 year increase in duration of exposure. The models were adjusted for history of stroke, myocardial infarction, hypertension, educational attainment, and diabetes duration. Sex, age, and calendar date were included via matching.
Figure 5B:
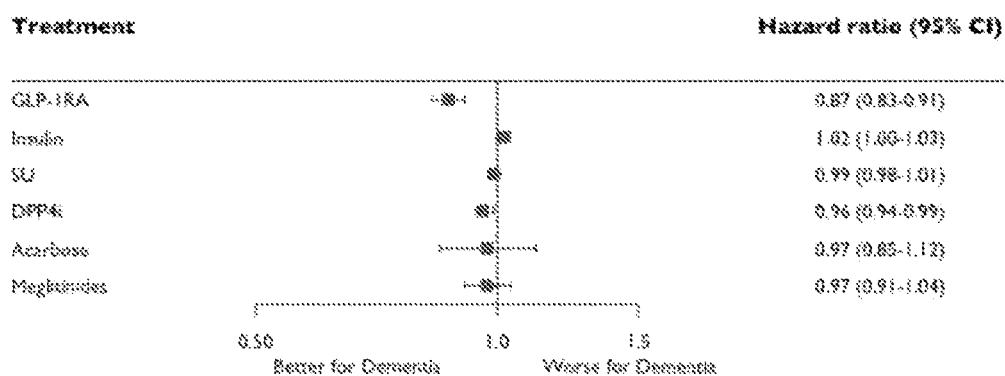
FIG. 5B shows hazard ratios for dementia with each 1 year increase in exposure duration to GLP-1 receptor agonists and other second-line diabetes Treatments in the Nationwide Cohort, where Diabetes Duration was Defined as "Time Since First Treatment with Metformin or Second-line Diabetes Treatment". Cox proportional hazards regression models conducted for exposure to each treatment. Estimates denote the hazard ratio for a 1 year increase in duration of exposure. The models were adjusted for history of stroke, myocardial infarction, hypertension, educational attainment, and diabetes duration. Sex, age, and calendar date were included via matching.
Figure 6A:
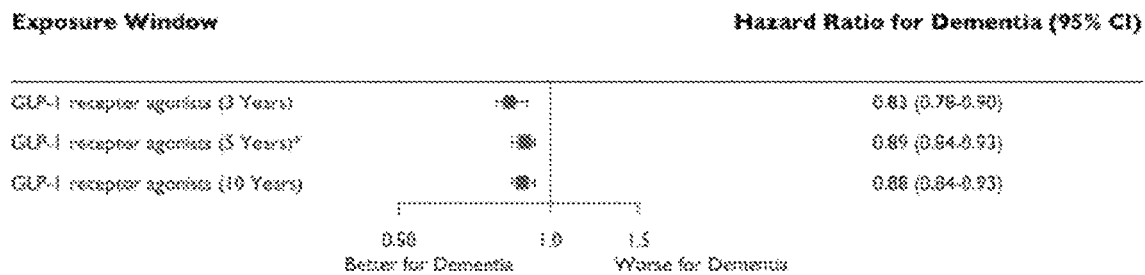
FIG. 6A shows hazard ratios for dementia with each 1 year increase in exposure duration to GLP-1 receptor agonists assessed 3, 5, and 10 years before diagnosis of dementia in the nationwide cohort. *Primary analysis. Cox proportional hazards regression models conducted for GLP-1 receptor agonist exposure and assessed during a 3, 5, and 10-year exposure window prior to dementia. Estimates denote the hazard ratio for a 1 year increase in duration of exposure. The models were adjusted for history of stroke, myocardial infarction, hypertension, educational attainment, and diabetes duration. Sex, age, and calendar date were included via matching.
Figure 6B:
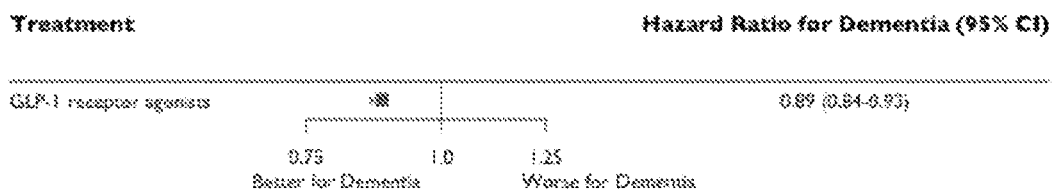
FIG. 6B shows hazard ratio for dementia with each 1 year increase in exposure duration to GLP-1 receptor agonist exposure in the nationwide cohort adjusted for age, sex, and calendar date via matching. Cox proportional hazards regression model conducted for exposure to GLP-1 receptor agonists. The estimate denotes the hazard ratio for a 1 year increase in duration of exposure. The model was adjusted sex, age, and calendar date via matching.
Figure 6C:
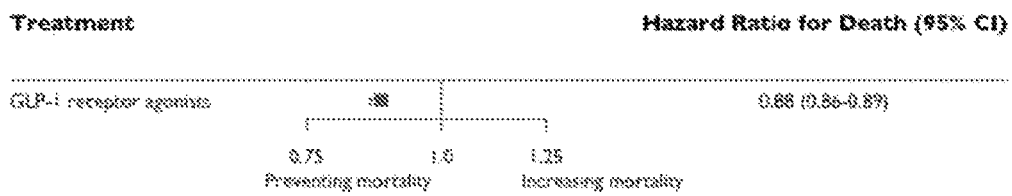
FIG. 6C shows hazard ratio for competing risk of death with each 1 year increase in exposure duration to GLP-1 receptor agonist in the nationwide cohort. Cox proportional hazards regression model conducted for exposure to GLP-1 receptor agonists. The estimate denotes the hazard ratio for a 1 year increase in duration of exposure. The model was adjusted for history of stroke, myocardial infarction, hypertension, educational attainment, and diabetes duration. Sex, age, and calendar date were included via matching.

The results were not changed by excluding exposure in the two years leading up to the diagnosis of dementia (FIG. 5A), and when diabetes duration was assessed as "time since first treatment with metformin or second line diabetes treatment", although an association with DDP4 inhibitors was found to be protective against dementia (FIG. 5B). Furthermore, the results for dementia remained unchanged when exposure to GLP-1 receptor agonists was assessed within 3 and 10 years before diagnosis of dementia (FIG. 6A). Adjusting for only age, sex, and calendar date via matching also yielded the same results (FIG. 6B). Lastly, the analysis of death as competing risk, which assessed the hazard ratio for death without a previous dementia diagnosis, showed a lower hazard ratio for death with exposure to GLP-1 receptor agonists (FIG. 6C).

In conclusion, it was found that treatment with GLP-1 receptor agonists was associated with a reduced risk of dementia in patients with diabetes.

TABLE 1

Baseline Characteristics in the Pooled RCTs

| Characteristics | GLP-1 Receptor Agonist (N = 7,907) | Placebo (N = 7,913) |
|---|---|---|
| Male sex - no. (%) | 5108 (64.6) | 5073 (64.1) |
| Age - no. (%) | 64.6 (7.2) | 64.8 (7.3) |
| <70 | 5942 (75.2) | 5850 (73.9) |
| 70-80 | 1764 (22.3) | 1864 (23.6) |
| 80-90 | 198 (2.5) | 198 (2.5) |
| >90 | 3 (0.4) | 1 (0.01) |
| Diabetes duration - mean (±SD) | 13.5 (8.2) | 13.5 (8.2) |
| Stroke - no. (%) | 1229 (15.5) | 1299 (16.4) |
| Myocardial infarction - no. (%) | 2554 (32.3) | 2531 (32.0) |
| Hypertension - no. (%)* | 5804 (91.9) | 5766 (91.2) |
| Chronic renal disease - no. (%)† | 189 (2.4) | 173 (2.2) |

*Not including the PIONEER 6 trial.
†Chronic renal disease is defined as eGFR < 30.

TABLE 2

Characteristics of the Case and Control Patients in the Nationwide Cohort

| Characteristics | Cases (N = 4,849) | Controls (N = 48,506) |
|---|---|---|
| Male sex - no. (%) | 2299 (47.4) | 22998 (47.4) |
| Age - no (%) | | |
| <70 | 1278 (26.4) | 12784 (26.4) |
| 70-80 | 2268 (46.8) | 22688 (46.8) |
| 80-90 | 1260 (26.0) | 12612 (26.0) |
| >90 | 43 (0.9) | 422 (0.9) |
| Diabetes duration - mean (±SD)*† | 6.6 (4.1) | 6.4 (4.1) |
| GLP-1 receptor agonists - no. (%) | | |
| 0 years | 4575 (94.3) | 44594 (91.9) |
| 1-2 years | 59 (1.2) | 623 (1.3) |
| 2-3 years | 35 (0.7) | 586 (1.2) |
| 3-4 years | 35 (0.7) | 483 (1.0) |
| 4-5 years | 74 (1.5) | 1076 (2.2) |
| Stroke - no. (%) | 760 (15.7) | 5628 (11.6) |
| Myocardial infarction - no. (%) | 527 (10.9) | 5241 (10.8) |
| Hypertension - no. (%)* | 3252 (67.1) | 31961 (65.9) |
| Chronic renal disease - no. (%)† | 233 (4.8) | 2287 (4.7) |
| Educational attainment - no. (%)‡ | | |
| Basic | 2490 (51.4) | 23920 (49.3) |
| Medium | 1508 (31.1) | 14971 (30.9) |
| Advanced | 427 (8.8) | 4681 (9.7) |

*Time since initiation of second-line diabetes treatment.
†At beginning of 5-year exposure window.
‡In patients who received GLP-1 receptor agonists.
∫ Educational status unknown in 424 (8.7%) cases and in 4934 (10.2%) controls.

TABLE S1

Data Sources.

| Data Source | Registers/databases/ Clinical Trial information | Variables |
|---|---|---|
| *Pooled RCTs* | | |
| LEADER | ClinicalTrials.gov number, NCT01179048. Multicenter, double-blind, placebo-controlled trial conducted at 410 sites in 32 countries | Liraglutide versus placebo |
| SUSTAIN-6 | ClinicalTrials.gov number, NCT01720446. Multicenter, double-blind, placebo-controlled trial conducted at 230 sites in 20 countries | Subcutaneous semaglutide versus placebo |
| PIONEER 6 | ClinicalTrials.gov number, NCT02692716 Multicenter, double-blind, placebo-controlled trial conducted at 214 sites in 21 countries | Oral semaglutide versus placebo |
| Nationwide cohort | The Danish National Patient Register | Diagnosis of: Dementia, hypertension, myocardial infarction, stroke, and chronic renal disease |

TABLE S1-continued

Data Sources.

| Data Source | Registers/databases/ Clinical Trial information | Variables |
|---|---|---|
| | The Danish register of Medicinal Product Statistics | Treatment for: Dementia, diabetes, and hypertension |
| | Danish Register of Causes of Death | Vital status, causes of death |
| | Population Education Register | Educational attainment |

TABLE S2

Overview of Definitions of Diabetes Treatments, Dementia, and Comorbidities for the Nationwide Cohort.

| Condition/treatment | ATC codes and ICD codes |
|---|---|
| Diabetes treatments (ATC codes) | |
| Metformin | A10BA02 |
| GLP-1 receptor agonists | A10BJ |
| Insulin | A10A |
| Acarbose | A10BF |
| DPP4 inhibitors | A10BH |
| Sulfonylureas | A10BB |
| Meglitinides | A10BX |
| TZD* | A10BG |
| SGLT-2i* | A10BK |
| Dementia (ATC codes) | |
| Donepezil | N06DA02 |
| Rivastigmine | N06DA03 |
| Galantamine | N06DA04 |
| Memantine | N06DX01 |
| (ICD codes) | DF00, DG30, DF01, DF023, DF028, DF03 |
| Comorbidities (ICD codes) | |
| Hypertension | ICD-10: DI10-DI13, DI15 |
| | ATC: C02-C03, C07, C09 |
| Myocardial infarction | ICD-8: 410 |
| | ICD-10: DI21, DI22 |
| Stroke | ICD-8: 433-438 |
| | ICD-10: DI63, DI64, DG458, DG459 |
| Chronic renal disease | ICD-8: 25002, 40039, 59009, 59320, 75310-75311, 75319 |
| | ICD-10: DN158-DN159, DQ612-DQ613, DQ615, DG619, DE102, DE112 DE132, DE142, DI120, DN160, DN162-DN164, DN168, DM300, DM313, DM319, DM321B |

*These products were not available at the same calendar period as GLP-1 receptor agonists and thus were not considered alternative treatment options to GLP-1 receptor agonists.
*The last 6 months of 2017, dementia was only defined by dementia treatments due to register availability.

TABLE S3

Dementia (Narrow Scope) Standardized MedDRA Queries (SMQs) Search Terms* Applied in the Post Hoc Analysis of the Pooled RCTs.

| Name | Scope |
|---|---|
| Clinical dementia rating scale score abnormal | Narrow |
| Corticobasal degeneration | Narrow |
| Creutzfeldt-Jakob disease | Narrow |
| Dementia | Narrow |
| Dementia Alzheimer's type | Narrow |
| Dementia of the Alzheimer's type, uncomplicated | Narrow |
| Dementia of the Alzheimer's type, with delirium | Narrow |
| Dementia of the Alzheimer's type, with delusions | Narrow |
| Dementia of the Alzheimer's type, with depressed mood | Narrow |
| Dementia with Lewy bodies | Narrow |
| Early onset familial Alzheimer's disease | Narrow |
| Frontotemporal dementia | Narrow |
| Hippocampal sclerosis | Narrow |
| Korsakoff's syndrome | Narrow |
| Mini mental status examination abnormal | Narrow |
| Mixed dementia | Narrow |
| Presenile dementia | Narrow |
| Prion disease | Narrow |

TABLE S3-continued

Dementia (Narrow Scope) Standardized MedDRA Queries (SMQs) Search Terms* Applied in the Post Hoc Analysis of the Pooled RCTs.

| Name | Scope |
| --- | --- |
| Progressive supranuclear palsy | Narrow |
| Scatolia | Narrow |
| Senile dementia | Narrow |
| Variant Creutzfeldt-Jakob disease | Narrow |
| Vascular dementia | Narrow |

*version 21.1

TABLE S4

Prespecified Sensitivity Analyses in the Nationwide Cohort.

Sensitivity Analyses

1) Reverse causation, where exposure two years before the case date was ignored
2) Diabetes duration defined as "time since first treatment with metformin or second line diabetes treatment
3) Shortening and lengthening the exposure windows (3- and 10-years, respectively)
4) Adjustment only via matching on age, sex, and calendar date
5) Competing risk of death

TABLE S5

Median Follow-up and Rates of Dementia in each of the Included RCTs.

| RCT | Treatment Groups | Median Follow-up Duration | Dementia SMQ GLP-1 Receptor Agonists no. of events | rate | Dementia SMQ Placebo no. of events | rate |
| --- | --- | --- | --- | --- | --- | --- |
| LEADER* EX2211-3748 | Liraglutide vs. placebo | 3.8 years | 12 | 0.69 | 25 | 1.45 |
| SUSTAIN-6† NN9535-3744 | Semaglutide (s.c) vs. placebo | 2.1 years | 3 | 0.88 | 5 | 1.47 |
| PIONEER 6‡ NN9924-4221 | Semaglutide (oral) vs. placebo | 1.3 years | 0 | | 2 | 0.96 |

*In LEADER, the minimum planned follow-up was 42 months, with a maximum of 60 months of receiving the assigned regimen and subsequently 30 days of follow-up.
†In SUSTAIN-6 the planned observation period was 109 weeks, consisting of 104 weeks of the assigned regimen and subsequently 5 weeks of follow-up.
‡In PIONEER 6, no predefined minimum treatment duration was required, but follow-up was required to continue until 122 events of the primary outcome had occurred.

TABLE S6

Hazard Ratio for Dementia in the Pooled RCTs according to Dementia Subtypes.

| Diagnoses | GLP-1 Receptor Agonist no. of patients | Placebo no. of patients | Hazard Ratio for Dementia (95% CI) |
| --- | --- | --- | --- |
| Dementia | 6 | 15 | |
| Dementia Alzheimer's type | 5 | 7 | |
| Dementia with Lewy bodies | 0 | 2 | |
| Mixed dementia | 2 | 2 | |
| Senile dementia | 1 | 3 | |
| Vascular dementia | 1 | 3 | |
| Total | 15 (0.19%) | 32 (0.40%) | 0.47 (0.25-0.86) |

Example 2—Semaglutide Prevents Cognitive Decline in the Senescence Accelerated Prone 8 (SAMP8) Mouse The inbred senescence-accelerated mouse-prone 8 (SAMP8) model is a non-transgenic mouse line that displays phenotypes associated with sporadic (not driven by a defined genetic cause) Alzheimer's dementia, including measurable cognitive decline. SAMP8 mice display accelerated ageing and thus also model age-related metabolic complications, showing increased markers of oxidative stress and inflammation. As cognitive deficits can be measured in this model prior to the presence of overt neuropathology such as the accumulation of amyloid plaques in the brain, this mouse model allows for the assessment of drug effects on preventing cognitive decline and models early stages of disease in humans.

Here, SAMP8 mice were utilized to characterize the impact of semaglutide treatment on memory deficits and cognitive decline. Two behavioural tests commonly used to assess cognitive deficits in rodents were employed to assay effects on short-term memory (Y-maze test) and long-term memory (step-through passive avoidance test). The Y-maze is test of short-term memory, assessing spatial working memory and exploratory behaviour by measuring spontaneous alternations, which is the frequency of entering a new arm of the maze rather than returning to one that was previously visited (described in methods). The step-through passive avoidance test measures associative long-term memory by assessing the learning of an association of an aversive stimulus to a particular context (described in methods). SAMP8 mice have measurable deficits in both tests as they age.

Methods

The experiment was carried out using SAMP8 mice with the following treatment groups: SAMP8 vehicle treated (n=24) and SAMP8 semaglutide (30 nmol/kg) treated (n=11). Treatment was commenced at six weeks of age. Treatment was delivered subcutaneously once a day, with an initial titration period of for semaglutide of 3 nmol/kg on the first day of dosing, 10 nmol/kg on the second day of dosing and proceeding with 30 nmol/kg thereafter.

Testing in the Y-maze was performed at 8 weeks of age and 16 weeks of age, at approximately 15 and 71 days following treatment initiation respectively. The Y-maze was comprised of grey polyvinylchloride with three arms 40 cm long, 13 cm high, 3 cm wide at the bottom, 10 cm wide at the top converging at an equal angle. Each mouse was placed at the end of one arm and allowed to move freely through the maze during an eight minute session. The series of arm entries including possible returns into the same arm was monitored and alternation was defined as entries into all three arms on consecutive occasions. The number of maximum alternations was therefore the total number of arm entries minus two and the percentage of alternation was be calculated as (actual alternations/maximum alternations)×100.

The step through passive avoidance performance was performed at 18 weeks of age. Testing was performed in an apparatus comprising of a two-compartment box (15×20×15 cm high) where one compartment was illuminated with white polyvinylchloride walls and the other was darkened with black polyvinylchloride walls and a grid floor. A guillotine door separated the compartments. A 60 W lamp positioned 40 cm above the apparatus illuminated the white compartment during the experiment. Scrambled footshocks (0.3 mA for 3 s) could be delivered to the grid floor using a shock generator scrambler (Lafayette Instruments, Lafayette, USA). A training session was first performed where the guillotine door was initially closed and each mouse was placed into the white compartment. After 5 s, the door was raised. When the mouse entered the darkened compartment and placed all four paws on the grid floor, the door was closed and the footshock delivered for 3 s to associate the darkened chamber with a footshock. A retention test was carried out 24 h after training. Each mouse was again placed into the white compartment and after 5 s, the door was raised. The step-through latency was recorded up to 300 s, defined as the time it took the mouse to enter the darkened compartment during the retention test. Escape latency was as recorded, defined as the time in the retention test to escape the darkened chamber following the application of a footshock.

Results

Figure 7:
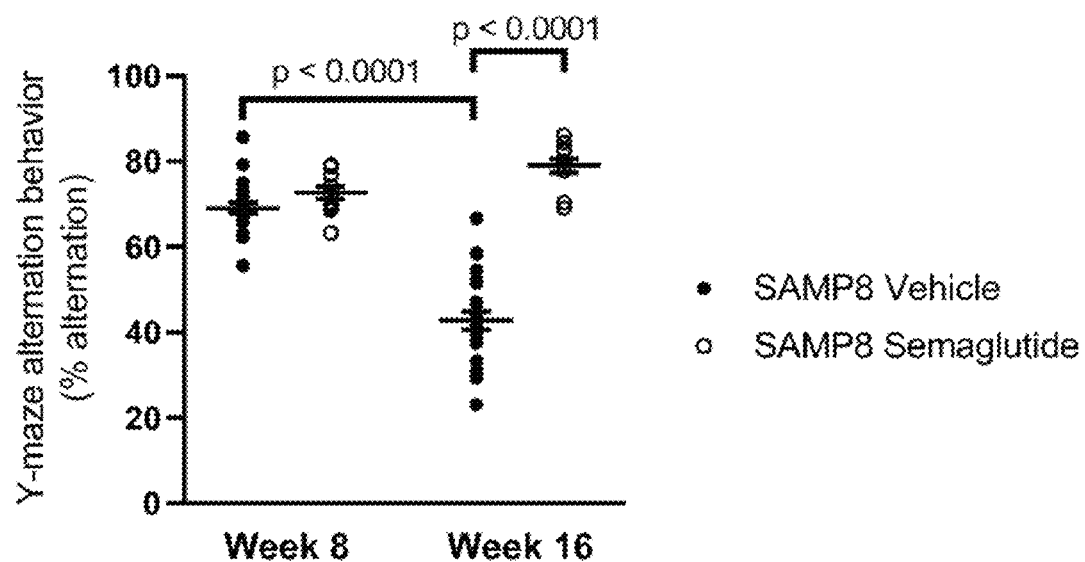
FIG. 7 shows effect on Y-maze alternation behaviour in SAMP8 mice administration of semaglutide compared to vehicle.

Data in FIG. 7 illustrates that vehicle-treated SAMP8 mice had, as expected, significantly decreased percentage alternation behaviour in the Y-maze at 16 weeks (mean±SEM: 42.8%±2.1%) versus 8 weeks (mean±SEM: 69.1%±1.3%) of age (p<0.0001, 2-way ANOVA, Sidak's multiple comparison test). Semaglutide-treated SAMP8 mice at 16 weeks of age had significantly improved alternation behaviour (mean±SEM: 79.1%±1.6%) compared to vehicle-treated SAMP8 (mean±SEM: 42.8%±2.1%) controls (p<0.0001, 2-way ANOVA, Sidak's multiple comparison test). These data show semaglutide has a positive effect on preserving short term memory function in SAMP8 mice as measured in the Y maze test.

Figure 8:
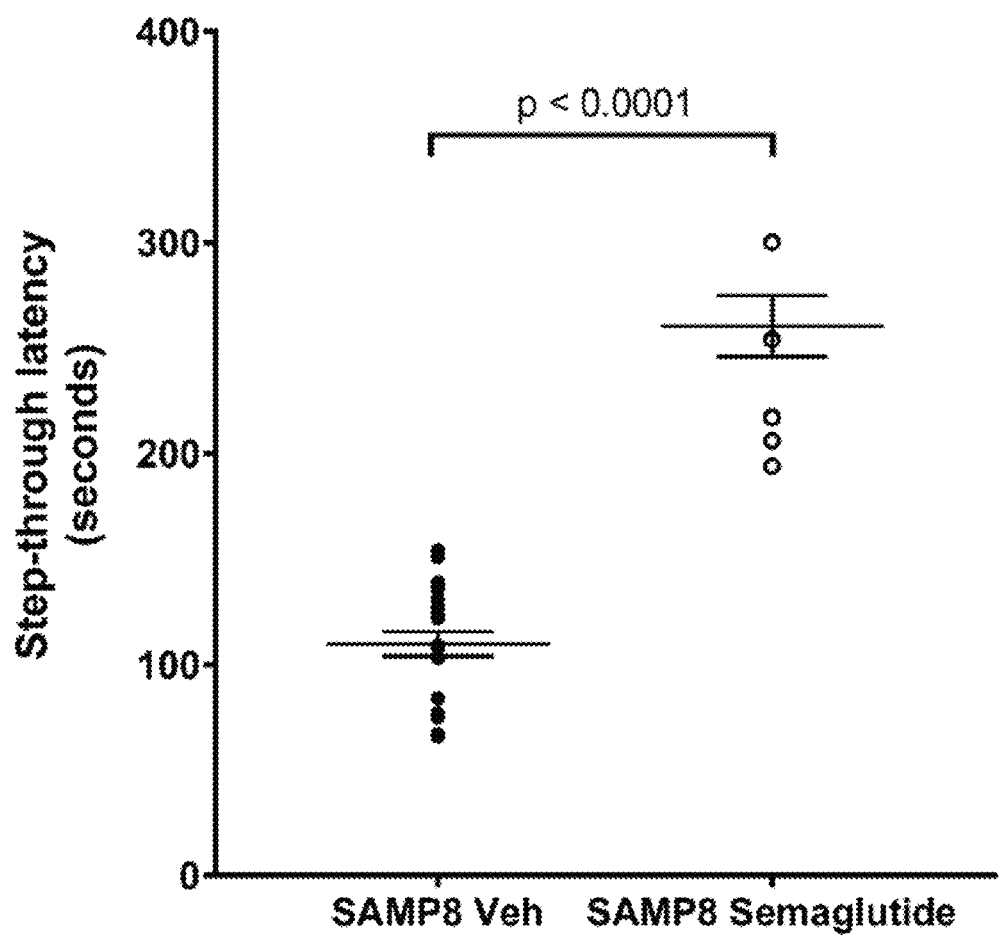
FIGS. 8 and 9 show improvement of long-term memory in SAMP8 mice as measured in the step-through passive avoidance test following administration of semaglutide compared to vehicle and presenting step-through latency (FIG. 8) and escape latency (FIG. 9).
Figure 9:
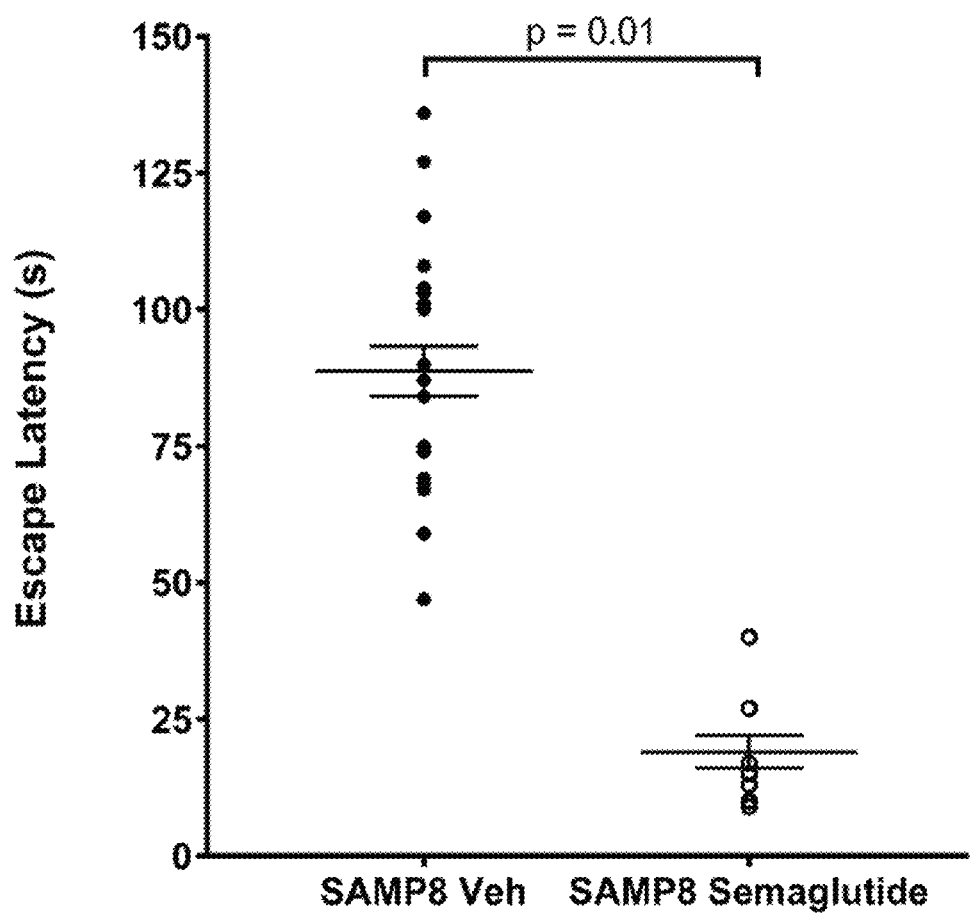

Semaglutide also improved long-term memory in SAMP8 mice as measured in the step-through passive avoidance test (FIG. 8-9). Semaglutide-treated SAMP8 mice had significantly increased step-through latency into the darkened chamber during the retention phase, which was previously associated with a footshock (FIG. 8; SAMP8 vehicle-treated mean±SEM: 109.8 seconds±5.8 seconds; SAMP8 semaglutide-treated mean±SEM: 260.5 seconds±14.5 seconds, p<0.0001, Mann-Whitney test). Semaglutide-treated SAMP8 mice also had significantly lower escape latency from the darkened chamber (FIG. 9; SAMP8 vehicle treated mean±SEM: 88.8 seconds±4.6 seconds; SAMP8 semaglutide-treated mean ±SEM: 19.0 seconds±3.0 seconds, p=0.01, unpaired t test).

Semaglutide treatment did not result in differences in body weight (16 weeks of age; SAMP8 vehicle-treated mean±SEM: 31.0 grams±0.43 grams or 148.0%±4.6% change in body weight from baseline; SAMP8 semaglutide-treated mean±SEM: 29.2 grams±0.7 grams or 145.4%±4.2% change in body weight from baseline) or blood glucose (SAMP8 vehicle-treated mean±SEM: 137.1 mg/dL±5.6 mg/dL; SAMP8 semaglutide-treated mean±SEM: 133.1 mg/dL±2.2 mg/dL) compared to vehicle treated animals.

Conclusion

Chronic semaglutide treatment prevented cognitive decline in SAMP8 mice. Semaglutide prevented decline in alternation behaviour in the Y-maze, indicating improved short-term and spatial memory compared to vehicle-treated SAMP8 controls. Semaglutide also prolonged the step-through latency and shortened the escape latency in the step-through passive avoidance test, which are positive indicators of longer-term memory performance and associative learning. These positive effects on cognitive parameters furthermore appear to be a novel effect of semaglutide that is not driven by changes in glycaemia or body weight. Example 2 surprisingly shows better effects of semaglutide than those published for liraglutide in the same animal model.

Example 3—Semaglutide Reduces Brain Inflammation (Neuroinflammation) in a Lipopolysaccharide (LPS) Inflammation Mouse Model Neuroinflammation is part of the pathology comprising dementia and Alzheimer's disease, with human brain imaging studies highlighting increased markers of inflammation in Alzheimer's disease (e.g. translocator protein 18 kDa levels) and genetic association studies in humans highlighting that genes associated with Alzheimer's disease are part of inflammatory pathways. Inflammation is also linked to metabolic disease in humans (obesity, type 2 diabetes, cardiovascular diseases) and thus could affect progression of cognitive decline and dementia in people with metabolic diseases.

LPS-induced neuroinflammation is used as a non-genetic model of Alzheimer's disease in rodents. LPS is an endotoxin from gram-negative bacteria that provides a persistent inflammatory stimulus activating brain immune cells (neuroimmune cells). Microglia are a brain immune cell type activated by LPS, and the degree of neuroinflammation can be assessed by the area of microglia in brain tissue as measured by the microglia-specific marker ionized calcium binding adaptor molecule 1 (Iba1).

Here, LPS-induced neuroinflammation in mice was used to assess the impact of semaglutide on attenuating brain inflammation in the hippocampus, a brain region involved in memory and learning which is deteriorated in Alzheimer's Disease.

Methods

The experiment was carried out using C57BL/6 mice at 8-10 weeks of age. Mice were treated with semaglutide (30 nmol/kg, subcutaneously once per day) or vehicle from Day 1 to Day 28 of the study. To induce inflammation, LPS was administered (1.0 mg/kg, intraperitoneally once per day) for three days at days 15-17 of the study, with control animals receiving vehicle. Induction of inflammatory cytokines was verified by measuring plasma tumor necrosis factor alpha levels on Day 15, one hour after LPS dosing. Animals were terminated at either Day 19 (Day 2 after LPS treatment) or Day 28 (Day 11 after LPS treatment) for to measure markers of neuroinflammation. All treatment groups had n=8-12.

Immediately after termination, whole brains were collected for immunohistochemical (IHC) analyses of neuroinflammation markers. Brains were immersion fixated in 10% neutral buffered formalin for approximately 48 h and then transferred to 70% ethanol and stored at 4° C. until paraffin embedding in blocks. Serial sections representing the rostrocaudal axis of the dorsal hippocampus were cut at 4 µm and collected on Superfrost plus slides. Paraffin embedded sections were de-paraffinated in xylene and rehydrated in series of graded ethanol. IHC for Iba1 was performed using Iba1 primary antibody (Abcam, Cat. Ab178845). Following antigen retrieval and blocking of endogenous peroxidase activity, slides were incubated with primary antibody. The primary antibody was detected using a linker secondary antibody followed by amplification using a polymeric HRP-linker antibody conjugate. Next, the primary antibody was visualized with DAB as chromogen and counterstained in hematoxylin.

Quantitative assessment of Iba1 signal was performed to measure the area of microglia in the hippocampus of the tissue section. Assessment was performed using a two-step protocol with VIS (Visiopharm, Denmark) software. First, crude detection of tissue at low magnification (1× objective) and delineation of the Region of Interest (ROI) was obtained. Second, detection of IHC-positive staining was performed at higher magnification (10× objective) inside the ROI. The quantitative estimates of IHC-positive staining were calculated as an area fraction (AF) of the total tissue area where:

$$AF_{IHC-positive\ signal} = \frac{Area_{IHC-positive\ signal}}{Area_{IHC-positive\ signal} + Area_{tissue}}$$

Results

Figure 10:
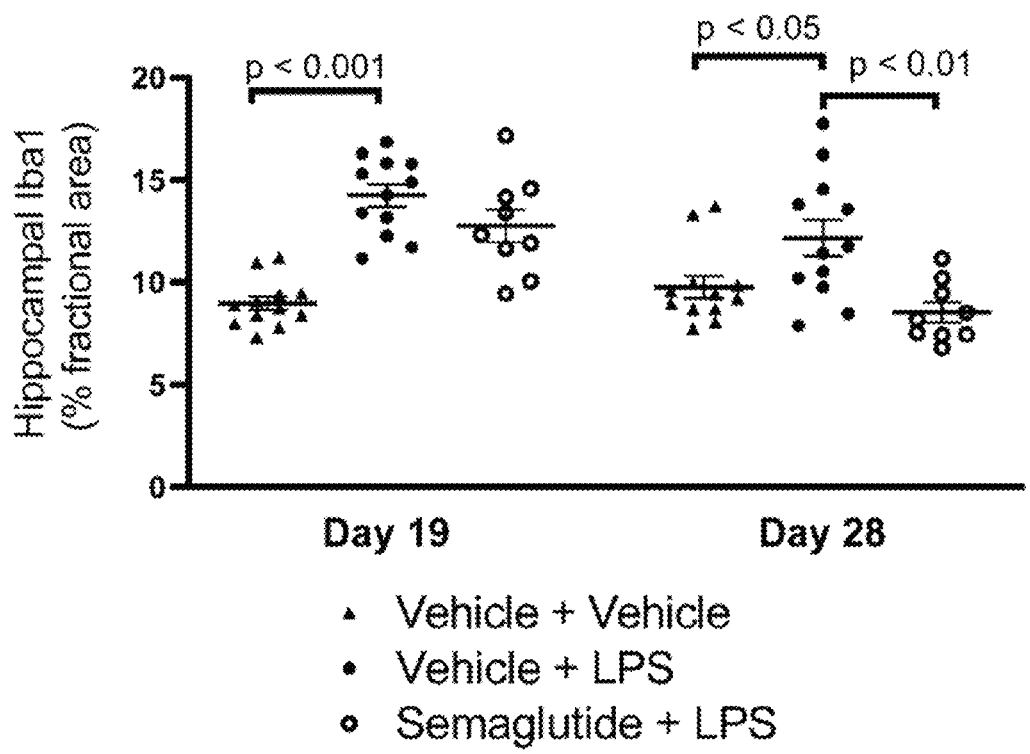
FIG. 10 shows effect of semaglutide in a lipopolysaccharide (LPS)-induced neuroinflammation, a non-genetic model of Alzheimer's disease in rodents, on the microglial inflammatory marker Iba1 in the hippocampus.

Semaglutide lowered the microglial inflammatory marker Iba1 in the hippocampus following LPS administration. Results in FIG. 10 show that LPS significantly increased hippocampal Iba1 area on Day 19 in mice dosed with LPS+vehicle compared to vehicle/vehicle dosed controls (p<0.001, Dunnett's test one-factor linear model; Day 19 vehicle/vehicle mean±SEM: 8.98%±0.34%, Day 19 LPS+vehicle mean±SEM: 14.25%±0.54%) illustrating that neuroinflammation was induced by LPS. On Day 28, while LPS+vehicle treated mice continued to have a significantly higher area of hippocampal Iba1 (p<0.05 vs vehicle/vehicle controls, Dunnett's test one-factor linear model; Day 28 vehicle/vehicle mean±SEM: 9.77%±0.54%, Day 28 LPS+vehicle mean±SEM: 12.17%±0.88%), semaglutide treatment significantly reduced Iba1 area in LPS+semaglutide-treated mice (p<0.01 vs LPS+vehicle treated mice, Dunnett's test one-factor linear model; Day 28 LPS+vehicle mean±SEM: 12.17%±0.88%, Day 28 LPS+semaglutide mean ±SEM: 8.53%±0.49%).

There was no meaningful difference in body weight at Day 28 between mice dosed with LPS+vehicle (mean±SEM: 23.83 g±0.33 g) versus those treated with LPS+semaglutide (mean±SEM: 22.98 g±0.70 g).

Conclusion

In an LPS-induced neuroinflammation model, semaglutide reduced neuroinflammation in both the hippocampus as measured by the area of microglia (Iba1). Semaglutide treatment reduced neuroinflammation implicating that this may be a novel mechanism through with semaglutide may have effects on cognition.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for treating Alzheimer's disease, comprising administering semaglutide to a human subject in need thereof, wherein said semaglutide is administered subcutaneously at a dosage in the range of 0.1 mg to 5.0 mg in the form of a pharmaceutical composition comprising one or more pharmaceutically acceptable excipients.

2. The method according to claim 1, wherein said pharmaceutical composition is in the form of a solution comprising at least 90% water and having a pH in the range from 7.0-9.0.

3. The method according to claim 1, wherein said semaglutide is the sole pharmaceutically active ingredient in said pharmaceutical composition.

4. The method according to claim 1, wherein said administration of said semaglutide reduces neuroinflammation in said subject's hippocampus.

5. The method according to claim 1, wherein said semaglutide is administered at a dosage in the range from 0.1 mg to 1.0 mg.

6. The method according to claim 1, wherein said semaglutide is administered at a dosage in the range from 0.1 mg to 0.5 mg.

7. The method according to claim 1, wherein said semaglutide is administered at a dosage in the range from 0.5 mg to 1.0 mg.

8. The method according to claim 1, wherein said semaglutide is administered at a dosage of about 0.5 mg.

9. The method according to claim 1, wherein said semaglutide is administered at a dosage of about 1.0 mg.

10. The method according to claim 1, wherein said semaglutide is administered at a dosage in the range from 0.1 mg to 1.0 mg once weekly.

11. The method according to claim 1, wherein said semaglutide is administered at a dosage in the range from 0.1 mg to 0.5 mg once weekly.

12. The method according to claim 1, wherein said semaglutide is administered at a dosage in the range from 0.5 mg to 1.0 mg once weekly.

13. The method according to claim 1, wherein said semaglutide is administered at a dosage of about 0.5 mg once weekly.

14. The method according to claim 1, wherein said semaglutide is administered at a dosage of about 1.0 mg once weekly.

15. The method according to claim 1, wherein said pharmaceutical composition has a pH in the range from 7.0-8.5.

16. The method according to claim 1, wherein the pharmaceutical composition further comprises one or more of a buffer, an isotonic agent, and a preservative.

17. The method according to claim 1, wherein the pharmaceutical composition further comprises one or more of a phosphate buffer, propylene glycol, and phenol.

18. The method according to claim 1, wherein the pharmaceutical composition further comprises a buffer.

19. The method according to claim 1, wherein the pharmaceutical composition further comprises an isotonic agent.

20. The method according to claim 1, wherein pharmaceutical composition further comprises a preservative.

21. The method according to claim 1, wherein the pharmaceutical composition further comprises a phosphate buffer, propylene glycol, and phenol.

22. The method according to claim 1, wherein the pharmaceutical composition further comprises a buffer and an isotonic agent.

23. The method according to claim 1, wherein the pharmaceutical composition further comprises a buffer and an isotonic agent and has a pH in the range from 7.0-8.5.

24. The method according to claim 1, wherein the pharmaceutical composition further comprises a buffer and an isotonic agent and has a pH in the range from 7.0-8.5, and wherein said semaglutide is administered at a dosage in the range from 0.1 mg to 1.0 mg semaglutide once weekly.

25. The method according to claim 1, wherein the pharmaceutical composition further comprises a buffer and an isotonic agent and has a pH in the range from 7.0-8.5, and wherein said semaglutide is administered at a dosage in the range from 0.5 mg to 1.0 mg semaglutide once weekly.

26. The method according to claim 1, wherein the pharmaceutical composition further comprises a buffer and an isotonic agent and has a pH in the range from 7.0-8.5, and wherein said semaglutide is administered at a dosage of 0.5 mg or 1.0 mg semaglutide once weekly.

27. A method for treating Alzheimer's disease, comprising administering semaglutide to a human subject in need thereof, wherein said semaglutide is administered subcutaneously at a dosage in the range from 0.1 mg to 6 mg once weekly, in the form of a pharmaceutical composition comprising one or more pharmaceutically acceptable excipients.

28. The method according to claim 27, wherein said semaglutide is the sole pharmaceutically active ingredient in said pharmaceutical composition administered to said subject.

29. The method according to claim 27, wherein said administration of said semaglutide reduces neuroinflammation in said subject's hippocampus.

* * * * *

SEQUENCE LISTING

```
Sequence total quantity: 1
SEQ ID NO: 1            moltype = AA  length = 31
FEATURE                 Location/Qualifiers
source                  1..31
                        mol_type = protein
                        organism = Homo sapiens
SEQUENCE: 1
HAEGTFTSDV SSYLEGQAAK EFIAWLVKGR G                           31
```